United States Patent [19]

Osman et al.

[11] Patent Number: 4,637,918

[45] Date of Patent: Jan. 20, 1987

[54] CATALYTIC GAS SYNTHESIS APPARATUS

[75] Inventors: Robert M. Osman, Parsippany; Larry J. Shulik, Morristown, both of N.J.

[73] Assignee: Exxon Research & Engineering Co., Florham Park, N.J.

[21] Appl. No.: 691,398

[22] Filed: Jan. 14, 1985

Related U.S. Application Data

[62] Division of Ser. No. 472,998, Mar. 7, 1983, Pat. No. 4,518,574.

[51] Int. Cl.$^4$ .............................................. B01J 8/04
[52] U.S. Cl. ................................... 422/148; 422/191; 422/192; 422/194; 422/203; 165/66
[58] Field of Search ............... 422/148, 191, 192, 194, 422/200, 203, 218; 423/360, 361; 122/7 R; 165/66, 125, 155

[56] References Cited

U.S. PATENT DOCUMENTS

| | | | |
|---|---|---|---|
| 3,403,000 | 9/1968 | Hennel | 23/199 |
| 3,515,520 | 6/1970 | Hervert | 422/191 |
| 3,721,532 | 3/1973 | Wright, et al. | 23/289 |
| 3,918,918 | 11/1975 | Kohn et al. | 422/192 |
| 4,101,281 | 7/1978 | Pagani | 23/288 |
| 4,180,543 | 12/1979 | Ward | 423/360 |
| 4,181,701 | 1/1980 | Topsoe, et al. | 422/158 |
| 4,224,299 | 9/1980 | Barber et al. | 423/360 |
| 4,341,737 | 6/1982 | Albano et al. | 422/191 |

FOREIGN PATENT DOCUMENTS

| | | | |
|---|---|---|---|
| 1442749 | 2/1969 | Fed. Rep. of Germany | 423/360 |
| 6509575 | 7/1975 | Netherlands | 423/360 |

OTHER PUBLICATIONS

G. P. Eschenbrenner and G. A. Wagner, "A New High Capacity Ammonia Converter", vol. 14, *Ammonia Plant Safety*, pp. 51–56, (Chem. Eng. Progr. Techn. Manual, AICHE, 1972).

*Primary Examiner*—S. Leon Bashore
*Assistant Examiner*—Andrew J. Anderson
*Attorney, Agent, or Firm*—J. B. Murray, Jr.

[57] ABSTRACT

The present invention is generally directed to an improved process and apparatus for the production of gaseous products such as ammonia by catalytic, exothermic gaseous reactions and is specifically directed to an improved process which utilizes a gas-phase catalytic reaction of nitrogen and hydrogen for the synthesis of ammonia. This improved process for the production of ammonia utilizes an ammonia converter apparatus designed to comprise at least two catalyst stages and a reheat exchanger so arranged as to provide indirect heat exchange of the gaseous effluent from the last reactor catalyst stage with the effluent from at least one other reactor catalyst stage having a higher temperature level in order to reheat the effluent from the last reactor catalyst stage prior to exiting the reactor vessel, thereby facilitating higher level heat recovery from the reactor effluent.

14 Claims, 11 Drawing Figures

4,637,918

CATALYTIC GAS SYNTHESIS APPARATUS

BACKGROUND OF THE INVENTION

This is a division of application Ser. No. 472,998 filed Mar. 7, 1983, now U.S. Pat. No. 4,518,574.

1. FIELD OF THE INVENTION

This invention relates to process and apparatus useful in catalytic gas synthesis reactions, and more specifically to process and apparatus useful in the synthesis of ammonia.

2. DESCRIPTION OF THE PRIOR ART

Generally, the manufacture of ammonia consists of preparing an ammonia synthesis gas from a nitrogen source, usually air, and from a hydrogen source, which is conventionally either coal, petroleum fractions, or natural gases. In the preparation of ammonia synthesis gas from natural gases, for example, a raw (that is, hydrogen-rich) synthesis gas is formed by first removing gaseous contaminants such as sulfur from the natural gas by hydrogenation and adsorption, and then by reforming the contaminant-free gas. The carbon monoxide in the raw synthesis gas is converted to carbon dioxide and additional hydrogen in one or more shift conversion vessels, and the carbon dioxide is removed by scrubbing. Further treatment of the raw synthesis gas by methanation may be used to remove additional carbon dioxide and carbon monoxide from the hydrogen rich gas, resulting subsequently in an ammonia synthesis gas containing approximately three parts of hydrogen and one part of nitrogen, that is, the 3:1 stoichiometric ratio of hydrogen to nitrogen in ammonia, plus small amounts of inerts such as methane, argon and helium. The ammonia synthesis gas is then converted to ammonia by passing the ammonia synthesis gas over a catalytic surface based on metallic iron (conventionally magnetite) which has been promoted with other metallic oxides, and allowing the ammonia to be synthesized according to the following exothermic reaction:

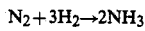

$$N_2 + 3H_2 \rightarrow 2NH_3$$

Ammonia synthesis, as is characteristic of exothermic chemical reactions, suffers from a competition between equilibrium and kinetics. The equilibrium conversion of hydrogen and nitrogen to ammonia is favored by low temperatures. However, the forward reaction rate to ammonia strongly increases with temperature. This leads to an optimal reactor temperature profile which starts relatively high, in order to get reaction rates as fast as possible while still far away from equilibrium, and which is then allowed to gradually fall along the reaction path in the reactor to improve equilibrium as the reaction progresses. Unfortunately, by definition, exothermic reactions give off heat, and hence the temperature tends to rise as the ammonia synthesis progresses, prematurely stopping the reaction when an unfavorable equilibrium is approached.

A number of solutions to this problem have evolved in the form of particular ammonia synthesis reactor designs. In modern, large scale ammonia plants (600 to 2,000 tons of ammonia per day) two general types predominate. Both use two or more adiabatic stages with cooling between stages in order to move away from equilibrium after each stage. The basic difference between the types of reactors is in the cooling method. In the first, a direct contact quench is used with a portion of unreacted cold feed being brought into contact with the heated effluent which is desired to be cooled. In the second type of reactor, indirect heat exchange is used to cool the desired gas streams. The former type of reactor is simpler in construction but is not as efficient because part of the feed by-passes all but the last stage in order to effect the desired cooling within the reactor. The optimum operation of either type, which can be readily calculated by one skilled in the art, employs a declining sequence of reaction stage outlet temperatures. This is illustrated by FIG. 7 of U.S. Pat. No. 4,181,701.

Since the reaction is exothermic, the heat of reaction can theoretically be recovered as useful waste heat. Conventionally, the waste heat is recovered from the reactor effluent, which, as previously mentioned, is relatively cold, since the last reaction stage has the lowest outlet temperature of the several beds within the reactor. Waste heat recovery between stages is known in the art and is disclosed in such references as U.S. Pat. Nos. 3,721,532; 4,101,281, 4,180,543, and 4,181,701 and in co-pending application Ser. No. 414,523 filed Sept. 2, 1982 (the disclosure of which application is hereby incorporated by reference). However, the reported schemes either require the expense of a second reactor vessel, or bear the risk of poisoning of the catalyst or of explosive and thereby safety-related problems in generating steam for removal of the reaction heat by use of steam generation coils located inside the reactor vessel, which generally contains a reduced catalyst that is potentially violently reactive with water or steam at the elevated temperatures which are used.

SUMMARY OF THE INVENTION

The present invention is generally directed to an improved process and apparatus for the production of gaseous products such as ammonia by catalytic, exothermic gaseous reactions and is specifically directed to an improved process which utilizes a gas-phase catalytic reaction of nitrogen and hydrogen for the synthesis of ammonia. This improved process for the production of ammonia utilizes an ammonia converter apparatus designed to comprise at least two catalyst beds so arranged as to provide indirect heat exchange of the gaseous effluent from the last reactor catalyst bed with the effluent from at least one other reactor catalyst bed having a higher temperature level in order to reheat the effluent from the last reactor catalyst bed prior to exiting the reactor vessel, thereby facilitating higher level heat recovery from the ammonia converter effluent.

The present invention is particularly advantageous in providing a method and apparatus suitable for retrofit of more active catalyst into existing exothermic reaction equipment.

DETAILED DESCRIPTION OF THE INVENTION

The apparatus of this invention will be described below particularly in relation to its use in the synthesis of ammonia. However, it will be understood that the apparatus is useful in any catalytic, exothermic gas synthesis reaction.

Figure 1:
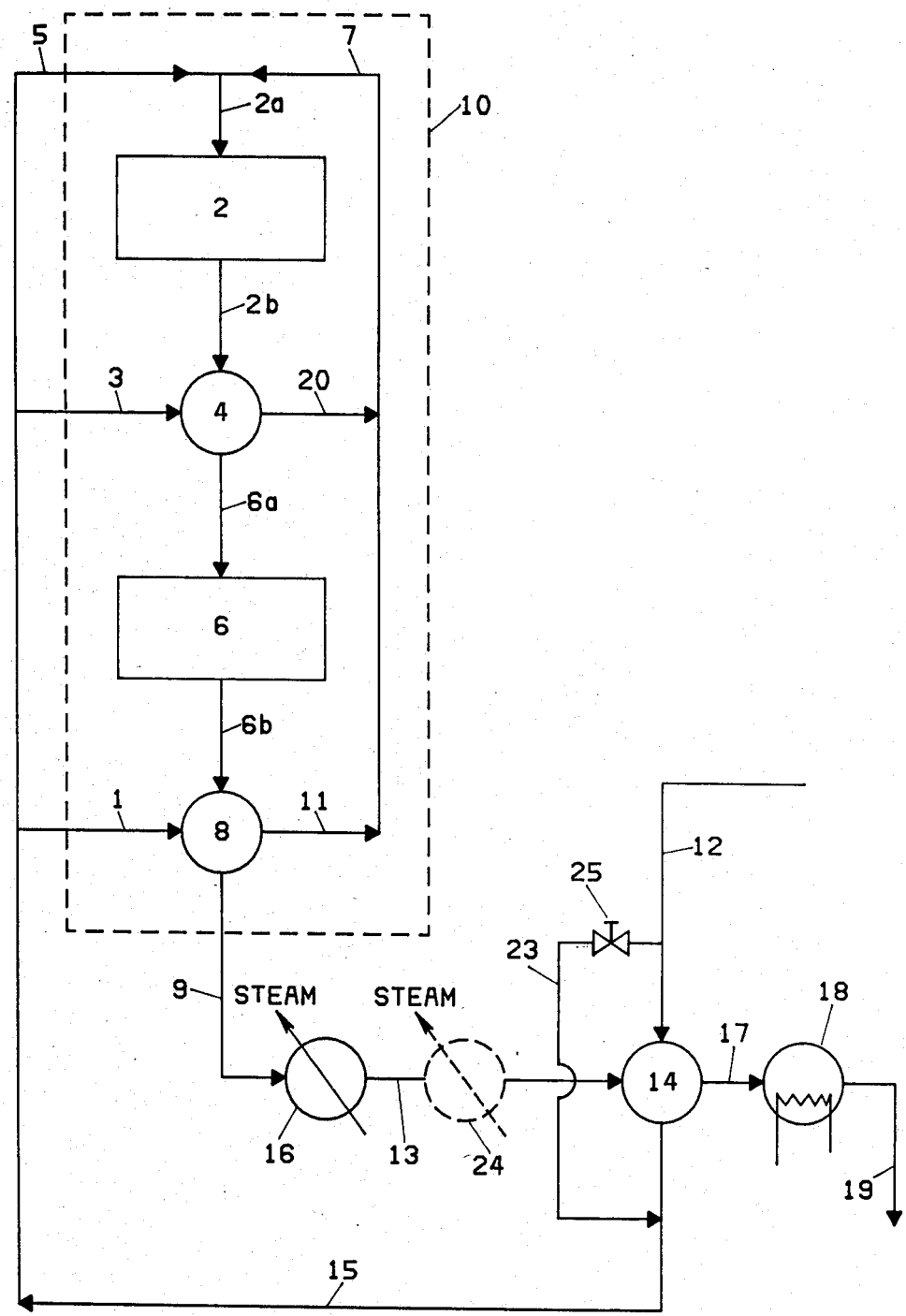
FIG. 1 is a perspective process schematic flowsheet of a prior art exothermic catalytic synthesis process.

Referring to FIG. 1, a typical prior art operating sequence is illustrated for an intercooled, two-stage catalytic reactor 10. The reactor vessel 10 contains a "catalyst basket" including two catalyst beds 2 and 6, and interbed heat exchanger 4 and lower heat exchanger 8. A portion of the feed gas 15 to the reactor is passed via conduit 1 to lower heat exchanger 8, and a separate portion via conduit 3 to interbed heat exchanger 4 for indirect cooling in these heat exchangers of gas streams 6b and 2b, respectively. If desired, a portion or all of either streams 1, 3 or 5 can be employed for annular cooling of the pressure shell of the reactor prior to introduction of these streams into the respective reactor components, that is, heat exchanger 8, heat exchanger 4, and first catalyst bed 2, respectively. When the desired gas product is ammonia, the gas feedstream will typically comprise a mixture of $N_2$ and $H_2$ (generally in a mole ratio of about 3:1, that is from about 2.5:1 to about 3.5:1) plus small amounts of inerts such as Ar and He. Catalyst beds 2 and 6 are controlled at their kinetically optimal temperatures via the two heat exchangers. Waste heat recovery from reactor effluent 9 is via a high pressure steam generator 16, located immediately downstream of reactor 10. By use of this steam generator, generally all of the available waste heat can be recovered from the effluent as high pressure steam (e.g., 900–2000 psig). Downstream of this boiler 16 is a feed/effluent heat exchanger 14 that preheats the converter feed 12. This exchanger 14 is provided with a bypass conduit 23, controlled by means of a bypass control valve 25, which can be used to control reactor feed temperature, if necessary. Valve 25 is generally fully closed, since this results in the maximum waste heat recovery. If the feed/effluent exchanger 14 is bypassed, more heat is thrown away to a water-cooled exchanger 18, which is located immediately downstream of feed-effluent exchanger 14.

In the embodiment shown in FIG. 1, devices 4 and 8 comprise heat exchangers. The prior art, however, has also proposed the replacement of exchanger 4 with direct contact quenching using a portion of the cooler, unreacted gas feed.

In the event a more active catalyst is retrofitted into reactor 10, it becomes possible to slow down the ammonia synthesis gas compressor and thereby decrease feed gas pressure and the total flow rate through the reactor. Due to the enhanced activity of the catalyst, the conversion per pass rises so that it is still possible to maintain a constant ammonia production rate even though the total flow rate total the reactor decreases. Also, again due to the enhanced catalyst activity, the kinetically optimum bed temperatures drop significantly and with the higher conversion per pass, the overall temperature rise across the reactor increases.

As a result of a retrofit of such a more active catalyst into reactor 10, the reduced flow rate means that recovery of all of the waste heat in high pressure boiler 16 (which has a roughly constant gas outlet temperature due to a cold-end heat transfer pinch, i.e., a small temperature driving force between the stream to be heated and the exiting heating fluid) would require an increase in the inlet temperature to the boiler, which would require a corresponding increase in the temperature of outlet gas 9 from reactor 10. However, the outlet temperature from second catalyst bed 6 has dropped substantially at the same time. This, in turn, means that it would be desired to do less heat transfer in the lower heat exchanger 8, and perhaps to completely bypass lower heat exchanger 8, effectively making the reactor outlet temperature equal to the outlet temperature of catalyst bed 6. However, if the new retrofit catalyst is sufficiently more active, this would still not achieve the objective of recovering all the waste heat in high pressure boiler 16, since the temperature of stream 6b would be less than the required temperature of stream 9.

Thus, with a retrofit of a substantially more active catalyst (for example, a retrofit catalyst having at least 20 percent, and preferably at least 50 to 200 percent or more, activity enhancement relative to the catalyst for which the reactor system was designed), the prior art processes require one to either open bypass valve 25 on the feed/effluent heat exchanger 14 and throw valuable waste heat away to cooling water exchanger 18, or to install a lower pressure boiler 24, downstream of high pressure boiler 16, to recover the heat at lower temperatures, e.g., as medium pressure steam (500–900 psig). The former approach, opening valve 25, throws away a large amount of the heat altogether, whereas the latter approach, requiring use of a lower pressure boiler 24, degrades part of the high pressure steam previously produced in boiler 16 to a lower pressure (and hence less valuable) steam, and requires investment for the new piece of equipment representing new boiler 24.

The extent to which such a retrofit of more active catalyst presents a loss of heat recovery efficiency can be seen by reference to Comparative Example 1, presented below.

Figure 2:
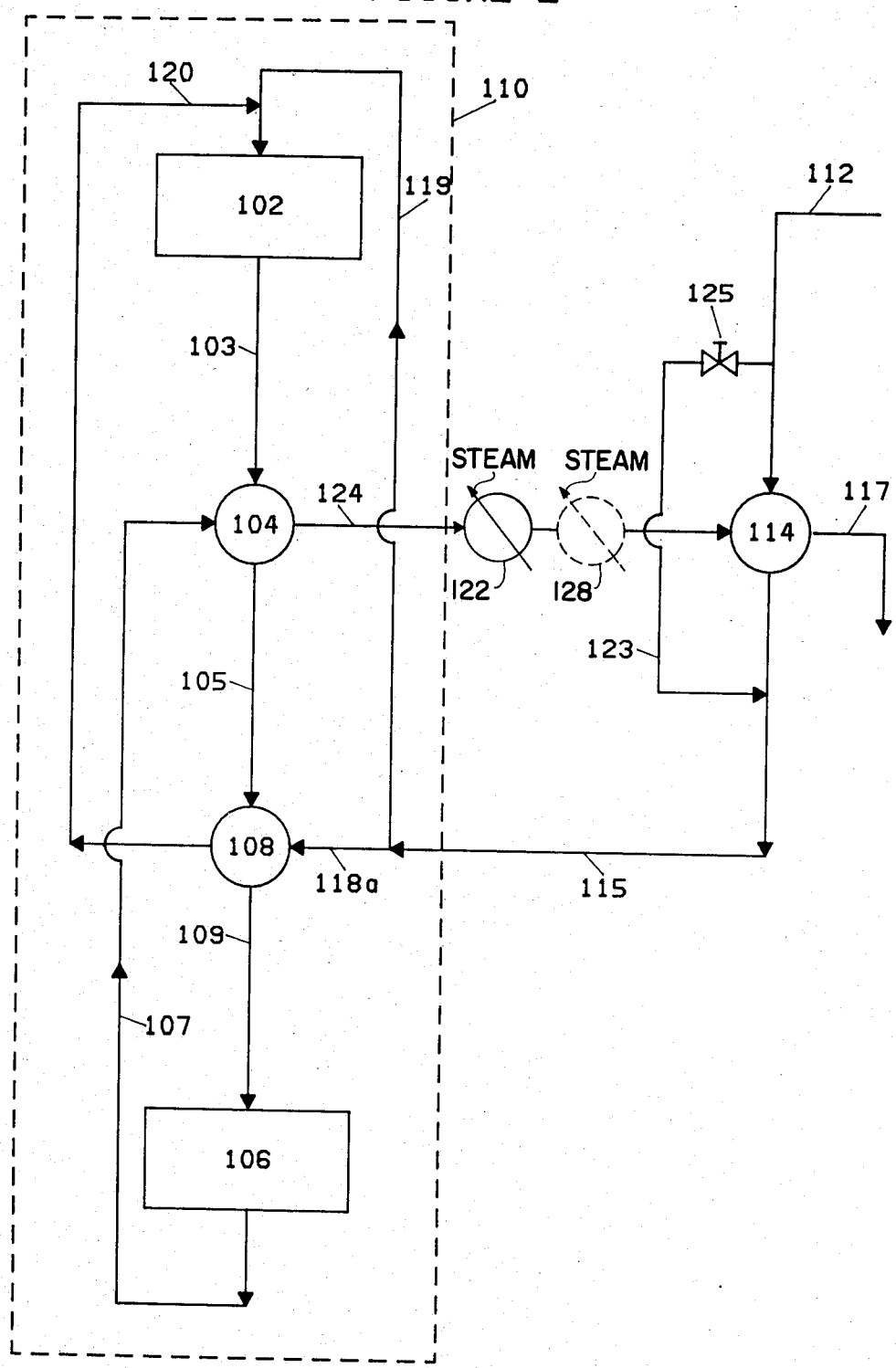
FIG. 2 is a perspective process schematic flowsheet of one embodiment of an improved exothermic catalytic synthesis process and reactor of the present invention, employing two heat exchangers and two catalyst beds.
Figure 3:
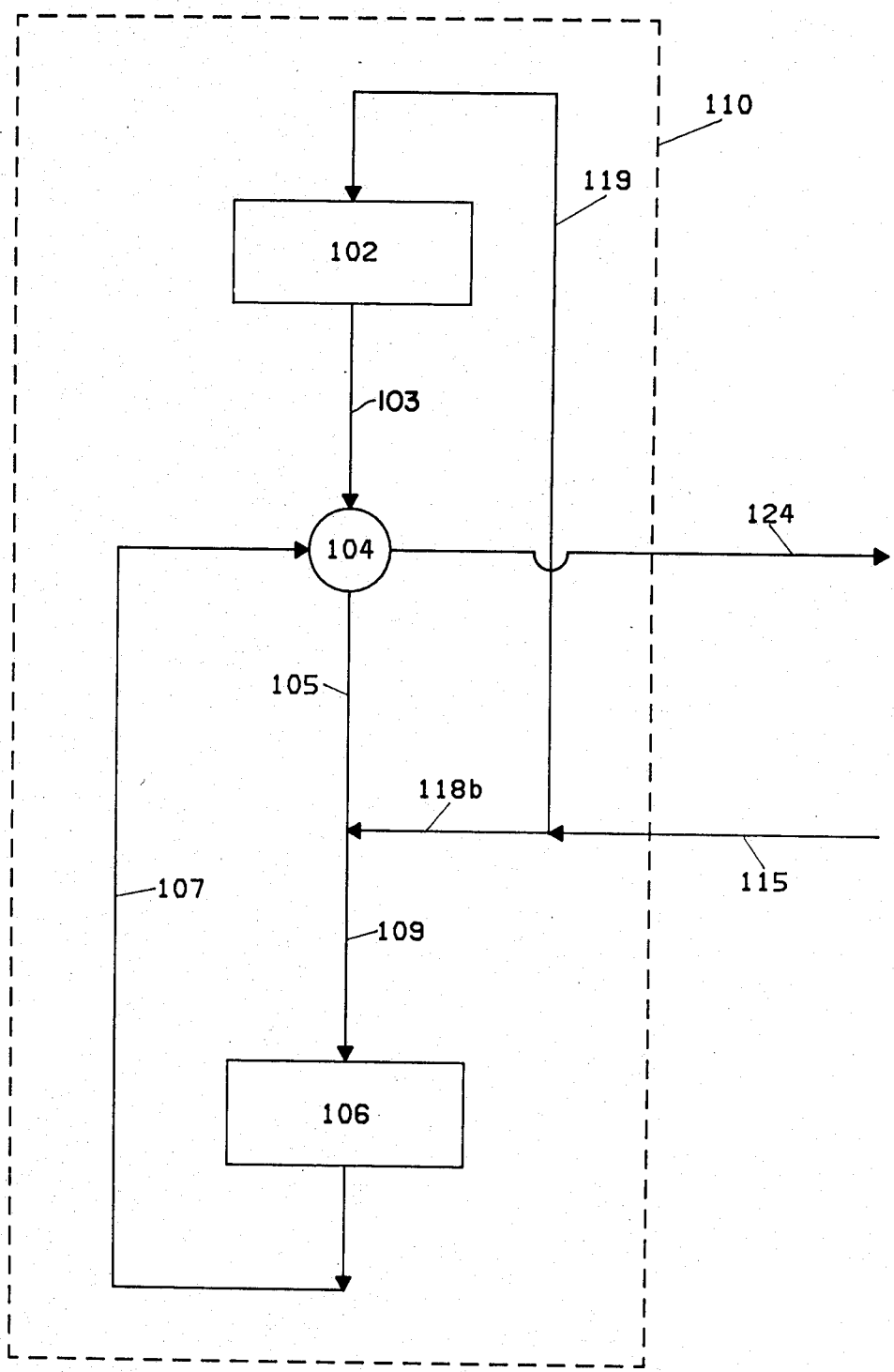
FIG. 3 is a perspective process schematic flowsheet of another embodiment of the improved exothermic catalytic synthesis process and reactor of the present invention, employing two catalyst beds, a single heat exchanger and direct contact quenching.
Figure 4:
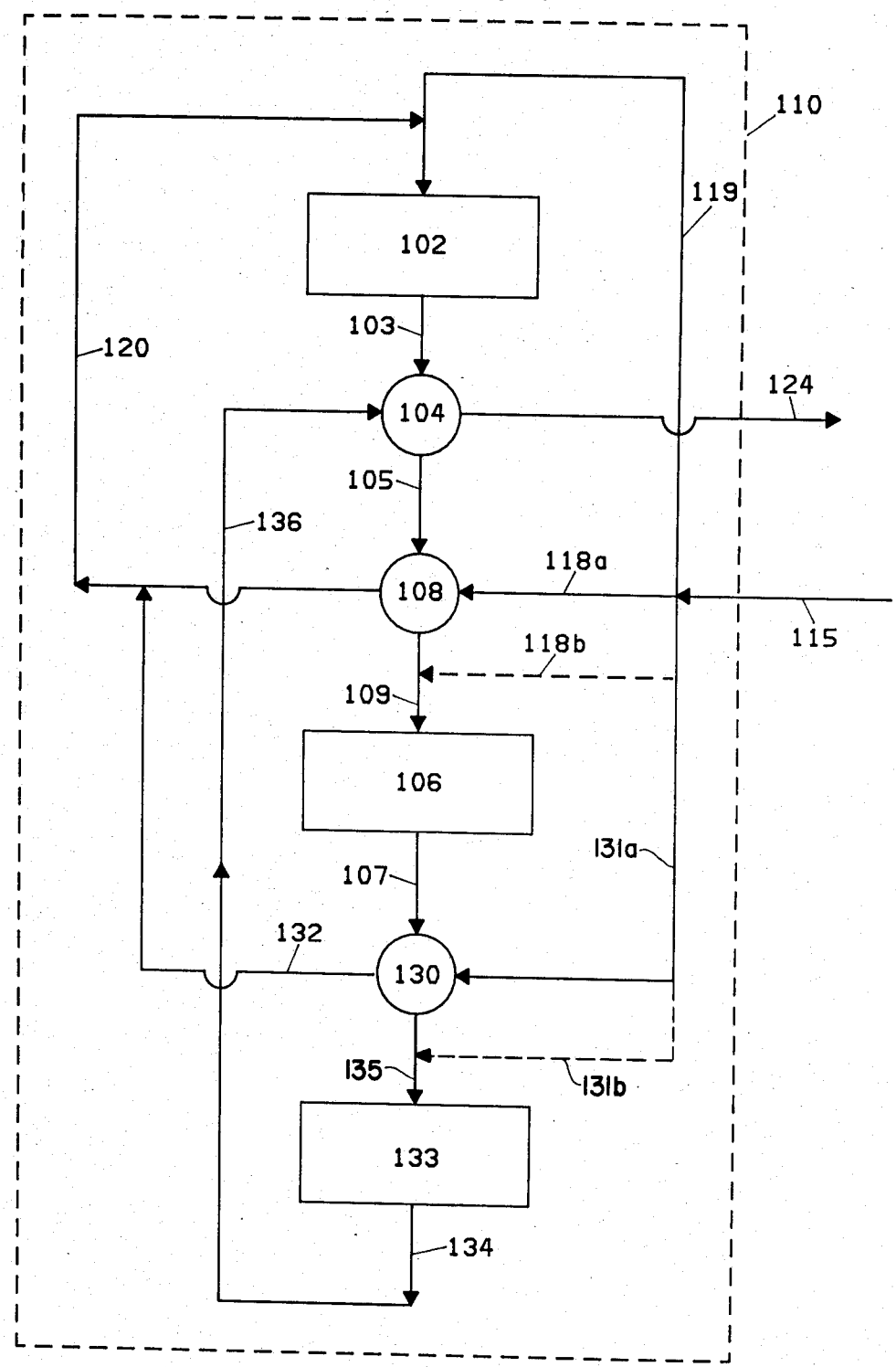
FIG. 4 is a perspective process schematic flowsheet of yet another embodiment of the improved exothermic catalytic synthesis process and reactor of the present invention, employing three catalyst beds, and a reheat exchanger in combination with one or more interbed exchangers and/or direct contact quenching.

In accordance with the improved process of this invention, the temperature of the effluent from the last reaction stage in an exothermic reactor, having two or more catalyst stages arranged for sequential gas flow therethrough, is increased by reheating at least a portion, and preferably substantially all, of this effluent gas in a reheat exchanger by indirect heat exchange with the effluent from the first or other reactor stage. FIGS. 2 and 3 illustrate this broad concept using an intercooled, two-stage catalytic reactor, and a quench-type reactor, respectively, and FIG. 4 illustrates this concept using a three-stage catalytic reactor. However, it will be understood that our concept is broadly applicable to designs using at least two catalyst stages, and to reactor designs using indirect heat exchange, and/or quench for interstage cooling of the effluent of one or more catalyst stages, although less reheating can be done in quench-type designs, since flows through the catalyst stages are unequal.

As used herein, the term "catalyst stage" is intended to refer to a catalyst bed within the reactor whose gaseous effluent is either cooled and passed to another catalyst bed within the reactor or, in the case of the last catalyst bed, is withdrawn as product gas from the reactor as described herein.

Reference is now made to FIGS. 2-4 which illustrate the reactor system of the process of this invention and wherein similar numbers refer to the same or similar elements.

Referring now to FIG. 2, one embodiment of the reactor system of the process of this invention is schematically illustrated. In reactor 110, there is provided first catalyst bed 102, interbed heat exchangers 104 and 108, and second catalyst bed 106. Reactor feed 112 is passed to feed/effluent exchanger 114 wherein the feed gas is preheated. The thus-heated feed gas 115 is then split into two portions. A first portion is passed as stream 119 to reactor 110 for feed to first catalyst bed 102. A second portion is passed as stream 118a to interbed heat exchanger 108 within reactor 110 for heating by heat exchange with gas stream 105 which is passed thereto from second exchanger 104, which comprises the reheat exchanger. The thus-heated feedstream 120 is withdrawn and combined with the remaining feed gas 119 for combined feed 121 to first catalyst bed 102. An effluent gas 103 is withdrawn from bed 102 and passed to reheat exchanger 104 wherein this gas effluent heats at least a portion of gas effluent 107 withdrawn from second catalyst bed 106 prior to withdrawing the second catalyst bed effluent from reactor 110. The partially cooled first catalyst bed effluent 105 is withdrawn from reheat exchanger 104, and passed to interbed heat exchanger 108 as explained above for heating of feed gas stream 118a, and the further cooled first bed effluent gas 109 is then passed to second catalyst bed 106. The effluent gas 107 from the second catalyst bed is heated in reheat exchanger 104 by first catalyst bed effluent gas 103 and is then withdrawn from reactor 110 via conduit 124 for waste heat recovery in steam generator 122. Thus, boiler 122 can comprise a high pressure boiler adapted to produce high pressure steam (e.g., 900–2000 psig). If desired, a lower pressure boiler 128 can be installed downstream of high pressure boiler 122 in order to recover waste heat at lower temperatures, for example, to produce medium pressure steam (500–900 psig). Following waste heat recovery, the reactor effluent is passed to feed/effluent exchanger 114 and is then withdrawn from the process via conduit 117 and can be passed to a cooling water exchanger (not shown) for further cooling. As illustrated, feed/effluent exchanger 114 is provided with bypass loop 123 which is controlled by means of valve 125 in order to control the temperature of the feed 115 to reactor 110.

If desired, a portion or all of streams 118a and/or 119 can be employed for annular cooling of the pressure shell of the reactor prior to the introduction of these streams into the respective reactor components, that is, heat exchanger 108 and first catalyst bed 102, respectively.

If desired for temperature control, a portion of stream 103 can be by-passed around reheat exchanger 104 and recombined with stream 105 downstream of exchanger 104. Alternatively, a portion of the second catalyst bed effluent gas 107 can be by-passed around exchanger 104 and recombined with product gas stream 124.

Referring to FIG. 3, another embodiment of the reactor system of the process of this invention is schematically illustrated which corresponds to the embodiment of FIG. 2, except that the second interbed heat exchanger is replaced by use of a direct contact quench. In this embodiment, the partially cooled first catalyst bed effluent gas is contacted with a portion of the cooler, unreacted feed gas prior to introduction of this gas into the second catalyst bed. In FIG. 3, reactor 110 is provided with first catalyst bed 102, interbed heat exchanger 104 (which comprises the reheat exchanger) and second catalyst bed 106. Reactor feed 115, after being preheated in feed/effluent exchanger 114 (not shown) is split into two portions. A first portion is passed as stream 119 to reactor 110 for feed to first catalyst bed 102. A second portion is passed as stream 118b to be employed for direct contact quenching of the partially cooled first catalyst bed effluent gas stream 105 which is then passed as feed to second catalyst bed 106. An effluent gas 103 is withdrawn from first bed 102 and passed to reheat exchanger 104 wherein this gas effluent heats at least a portion of the gas effluent 107 withdrawn from second catalyst bed 106, prior to withdrawing the second catalyst bed effluent gas from reactor 110. The partially cooled first catalyst bed effluent 105 is withdrawn from exchanger 104 and further cooled to the desired temperature by contact with quench-gas stream 118b to form a combined mixture 109 which is then passed as feed to second catalyst bed 106. The second catalyst bed effluent gas heated in reheat exchanger 104 is withdrawn therefrom via conduit 124 for waste heat recovery in steam generator 122 as described above. If desired, a portion or all of feed gas streams 119 and/or 118b can be employed for annular cooling of the pressure shell of the reactor prior to the introduction of this stream into first catalyst bed 102.

As indicated above, the concept of this invention is equally applicable to the use of more than two catalytic beds/stages. FIG. 4 illustrates a reactor 110 employing three catalyst beds 102, 106 and 133. In this embodiment, preheated, fresh gas feed 115 is divided into three portions. A first portion 119 is passed as a part of the gas feed to first catalyst bed 102. A second portion is introduced to first interbed heat exchanger 108 via conduit 118a, and a third portion is introduced via conduit 131a to second interbed heat exchanger 130. The thus-heated portion of heating fluid passed to exchanger 130 is withdrawn therefrom via conduit 132 and combined with the remaining portion of the heated synthesis gas in conduit 120 for feed to first catalyst bed 102, as described above.

The gaseous effluent from first bed 102 is passed as stream 103 to reheat exchanger 104 wherein at least a portion of the gaseous effluent from the last catalyst bed, third catalyst bed 133 in the embodiment of FIG. 4, is heated prior to withdrawing gas product 124 from reactor 110. The partially cooled first catalyst bed effluent is then further cooled by means of first exchanger 108 via indirect heat exchange with gas feed 118a (or, optionally, by direct contact quenching in lieu of exchanger 108, using a portion of the cooler, gas feed introduced, for example, as stream 118b. The resulting cooled first bed effluent gas 109 is then passed as feed to second catalyst bed 106. After the further reaction which takes place in bed 106, the second bed effluent 107 is cooled in second interbed exchanger 130 with the third gas feed portion 131a (or, optionally by direct contact quenching in lieu of exchanger 130, using a portion of the cooler, gas feed introduced, for example, as stream 131b). The resulting cooled second catalyst bed effluent gas is then withdrawn as stream 135 for feed to third catalyst bed 133. As described above, at least a portion of the gaseous effluent from third bed 133 is passed as stream 134 to reheat exchanger 104. Product gas is withdrawn via conduit 124 from reactor 110 and can then be passed to heat recovery, as described above with respect to FIG. 2. As with the preceding figures, if desired, a portion or all of streams 119, 118a, 118b, 131a and/or 131b can be employed for annular cooling of the pressure shell of the reactor 110 prior to the introduction of these streams into the respective reactor components.

While not illustrated, it will be apparent that the partially cooled first catalyst bed effluent 105 withdrawn from reheat exchanger 104 can be directly introduced as feed into second catalyst bed 106 and that, in this embodiment, no interbed heat exchanger 108 or interbed quenching via conduit 118b is employed for further cooling of the gas in stream 105 prior to its introduction into second bed 106. In this embodiment, therefore, the feed to first catalyst bed 102 will comprise feed gas portion 119 and feed gas portion 132, (where heat exchanger 130 is employed for cooling of the second catalyst bed effluent gas 107).

The embodiments illustrated in FIGS. 2-4 are, of course, not limiting of this invention, and reactors containing more than three catalyst stages can also be employed.

As will be illustrated in FIGS. 5-11, the heat exchangers used in the process of this invention can comprise baffled tubular heat exchangers. However, these heat exchangers can be of any suitable type, such as for instance plate-fin exchangers, close tube exchangers and the like. Also, while the catalyst beds are preferably each arranged for radial flow of gases therethrough, it will be understood that our invention is not limited thereby and that one or more (or all) of the catalyst beds can comprise (1) longitudinal flow beds in which the gas flows through the beds in a direction which is substantially parallel to the vertical longitudinal axis of the reactor, or (2) transverse flow beds in which the gas flows through the beds in a direction which is transverse to the major direction of gas flow through a horizontal reactor, such as are illustrated in G. P. Eschenbrenner and G. A. Wagner, "A New High Capacity Ammonia Converter", vol. 14, *Ammonia Plant Safety*, 51-56, (Chem. Eng. Progr. Techn. Manual, AICHE, 1972).

As is the case in FIG. 2, in the embodiments of FIGS. 3 and 4, it will be understood that one or more of exchangers 104, 108 and 130, where applicable, can be by-passed by selected amounts of the heating fluid passed thereto, in order to provide the desired temperature control. Furthermore, a portion of the last catalyst bed effluent gas 107 and 134 in FIGS. 3 and 4, respectively, can be by-passed around reheat exchanger 104 for temperature control.

Figure 5:
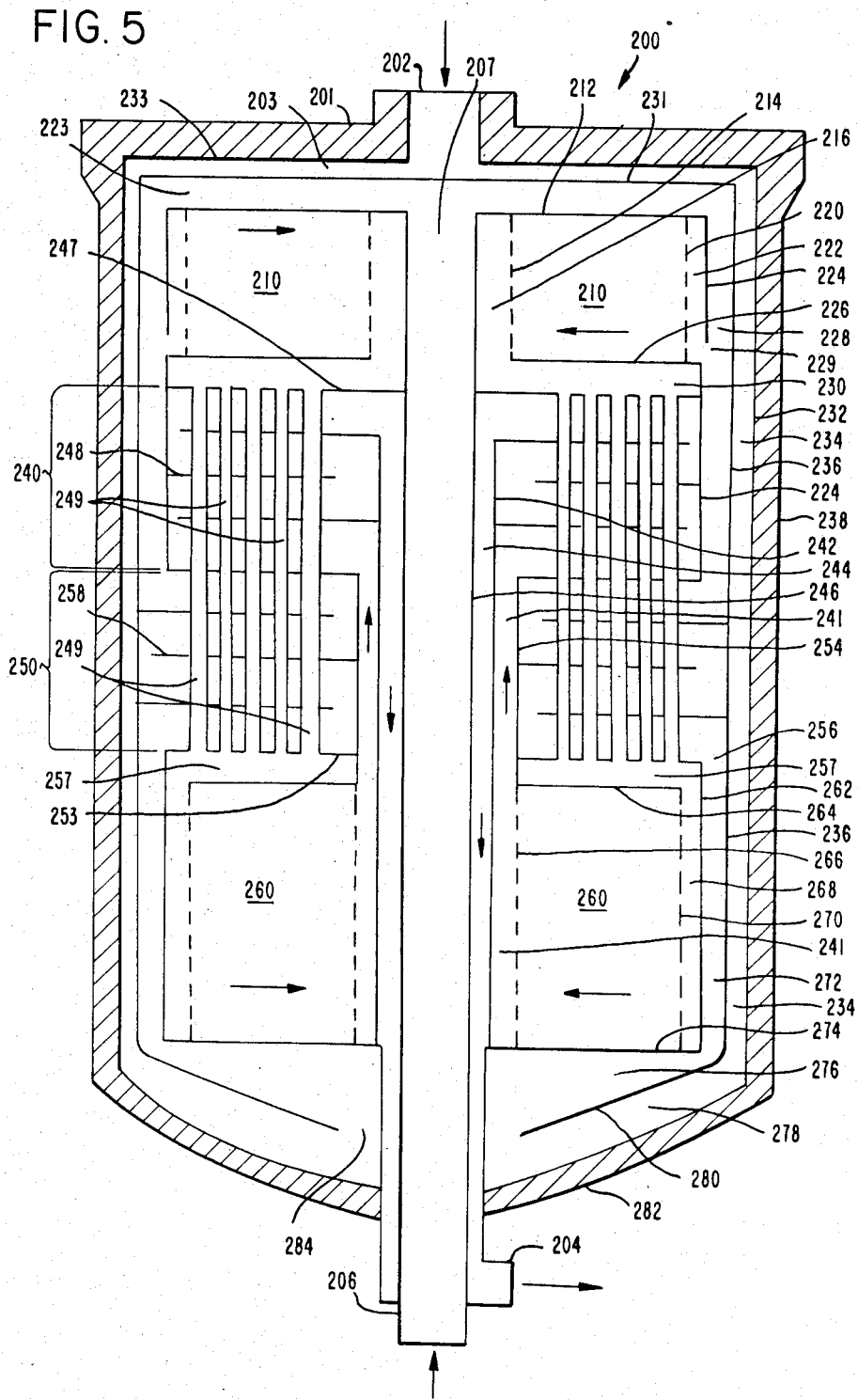
FIG. 5 is a sectional elevation flow diagram of a first embodiment of the reactor vessel of the present invention.

Referring now to FIG. 5, one embodiment of the reactor vessel of the present invention is illustrated which is generally indicated at 200. As illustrated, reactor 200 comprises a cylindrical pressure-resistant shell 238 having an upper circular closure member 201 provided with a centrally-located aperture 202 through which gas feed enters the vessel into a gas-header space 203 defined by inner surface 233 of closure member 201 and upper closure plate 231 of reactor cartridge 236. At the lower-most end of reactor shell 238 is located a concentric tubular assembly comprising an outer tube 204 for removal of gas product from the reactor and an inner tube 206 for passage of additional quantities of gas feed to the reactor, both tubes 204 and 206 being preferably positioned coaxially with the longitudinal axis of reactor shell 238. Reactor cartridge 236 is sized so as to provide an annular cooling channel 234 between the inner vertical surfaces 232 of reactor shell 238 and the outer vertical surfaces of cartridge 236. In addition, reactor cartridge 236 is sized so that the lower-most portion of reactor cartridge 236, comprising surfaces 280, defines (1) a lower gas space 278 beneath surfaces 280 and above the inner surface of lower portion 282 of shell 238, (2) a second gas space 276 above surfaces 280 and below lower catalyst plate 274 of lower catalyst bed 260, and (3) a gas opening 284, annularly arranged about the assembly of tubes 204 and 206, to allow feed gas to pass into second gas space 276. Positioned within reactor cartridge 236, are upper catalyst bed 210, baffled reheat exchanger 240, baffled interbed heat exchanger 250 and lower catalyst bed 260, all arranged in an annular manner about the cylindrical axis of pressure shell 238. The upper surface of annular catalyst bed 210 is defined by a circular closure plate 212, and forms a second header space 223 (beneath upper cartridge closure plate 231) which communicates with interior passageway 207 of inner tube 206 to permit a first portion of the synthesis gas feed, which is introduced into feed tube 206, to pass upwardly from the lower portion of shell 238 to second header space 223 and thence radially, outwardly above upper closure plate 212 to annular gas passageway 228, which is formed by the outer cylindrical sheet 224 of catalyst bed 210 and the adjacent inner vertical surfaces of reactor cartridge 236 to permit gases to pass downwardly to and through opening 229 which is provided about the circumference of cylindrical sheet 224 and thereby to enter catalyst bed 210.

The second portion of the synthesis gas feed, introduced into aperture 202, passes downwardly to, and then outwardly through, gas header space 203 and then downwardly into annular cooling channel 234 to provide annular cooling of pressure shell 238. The feed gas passes out of the lower portion of annular channel 234 into lower gas space 278 and then upwardly through opening 284 into second gas space 276 and then into annular gas space 272, which is defined by the outer cylindrical sheet 262 and the inner wall of reactor cartridge 236. In annular space 272, the gases flow past lower catalyst bed 260 and into the shell side of interbed heat exchanger 250 by way of opening 256. In exchanger 250, the gas feed is caused to flow a tortuous path by means of baffles 258 and is heated further by indirect heat exchange with gaseous effluent from first catalyst bed 210 (which has been first partially cooled in reheat exchanger 240, as described in more detail below). The thus-heated feed gas is withdrawn from exchanger 250 and passes upwardly through annular space 228, along the outer vertical walls 224 of exchanger 240, to enter first catalyst bed 210 by way of opening 229, together with the remaining feed gas which is passed downwardly to annular space 228 from second header space 223, as described above.

Catalyst bed 210 comprises lower catalyst plate 226, which supports the catalyst, and circular closure plate 212, and is provided with an outer gas permeable wall 220 (which defines an annular gas distribution channel 222 in order to permit gases entering opening 229 to distribute within catalyst bed 210) and inner gas permeable wall 214. (Gas permeable walls in this invention can be illustrated by metal sheets and/or screens having suitable perforations to permit gas passage while avoiding spillage of catalyst particles from the catalyst beds.) Walls 214 and 220 are at their lower ends secured to catalyst plate 226.

Gases exiting catalyst bed 210 pass through permeable wall 214 and enter annularly-shaped gas withdrawal channel 216 defined by gas permeable wall 214 and the adjacent portions of outer cylindrical surface 246 of gas inlet tube 206. Gases exiting upper catalyst bed 210 pass from passageway 216 into first baffled heat exchanger 240 via gas space 230 defined by lower catalyst plate 226 and the upper tubesheet 247 of exchanger 240. This gas effluent enters tubes 249 of exchanger 240 for heating of the gaseous effluent from second catalyst bed 260, which is caused to flow a tortuous path through exchanger 240 by means of baffles 248. Gases are passed from exchanger 240 into exchanger 250, and in the embodiment shown, the two exchangers employ common gas passage tubes 249. In the lower portion of tubes 249, in interbed exchanger 250, the gas effluent from catalyst bed 210 is additionally cooled by means of a portion of gas feed which is passed thereto in order to effect a final stage of cooling of this upper catalyst bed effluent to the desired feed temperature to lower catalyst bed 260. The gases exit tubes 249 of interbed exchanger 250 into gas space 257 defined by lower tubesheet 253 of interbed heat exchanger 250 and circular closure plate 264 of second catalyst bed 260 and are then passed downwardly into annular gas distribution channel 268 (defined by outer cylindrical sheet 262 and outer gas permeable wall 270), through the outer gas permeable wall 270, and radially, inwardly through catalyst bed 260, through inner gas permeable wall 266 and thence as gas effluent from second catalyst bed 260, into annular gas withdrawal channel 241 defined by inner cylindrical sheet 242 and inner gas permeable wall 266, along bed 260, and second inner cylindrical sheet 254, along interbed heat exchanger 250. The resulting second catalyst bed gas effluent passes upwardly through annular gas passage 241, after bypassing interbed heat exchanger 250, into reheat exchanger 240, for heating by indirect heat exchange with the gas effluent from first catalyst bed 210. The thus-heated effluent gas is withdrawn from the shell side of reheat exchanger 240 via annular product passage 244, defined by inner cylindrical sheet 242 and outer cylindrical surface 246 of gas feed tube 206, and is then discharged from reactor 200 as product via product tube 204.

In operation, a first portion of the synthesis gas feed is introduced via feed tube 206 into the lower portion of reactor 200. This feed gas passes upwardly through feed passage 207 to second upper header space 223 from which the gas is passed outwardly, radially to and then downwardly along, inner annular channel 228 for introduction via opening 229 as a portion of tne gas feed to first catalyst bed 210. A second portion of the gas feed to reactor 200 is then introduced via aperture 202 into upper header space 203 and thence to annular cooling channel 234 for cooling of pressure shell 238. These cooling gases are withdrawn from cooling channel 234 at the lower portion thereof into successive gas spaces 278 and 276 and are then introduced into inner gas channel 272 for passage to the shell side of interbed exchanger 250. In exchanger 250, this portion of the feed gas is heated by indirect heat exchange with partially cooled first catalyst bed effluent gas and the thus-heated feed gases are withdrawn from the shell side of exchanger 250 into the lower portion of inner annular gas channel 228 for passage to opening 229 as the remaining portion of the gas feed to first catalyst bed 210.

Gas product is collected from catalyst bed 210 into gas withdrawal channel 216 and then passed downwardly into gas space 230 for introduction into tubes 249 of reheat exchanger 240, wherein the first catalyst bed effluent gas heats the effluent gas from the second catalyst bed and from which the first bed effluent gases, after being partially cooled, are passed to the tube side 249 of exchanger 250 for liberation of additional heat therefrom by the above-described heating of the annular cooling gases introduced to the shell side of exchanger 250. Further cooled first catalyst bed effluent gas is passed from exchanger 250 into gas space 257 and thence into gas distribution channel 268 for feed to second catalyst bed 260. The further reacted gas is withdrawn from catalyst bed 260 into inner gas withdrawal channel 241, and the second catalyst bed effluent gas is then passed to the shell side of exchanger 240 for heating with first catalyst bed effluent gas as described above. The thus-heated second catalyst bed effluent gas is withdrawn from the shell side of exchanger 240 into gas product channel 244 and ultimately withdrawn from reactor 200 via product tube 204.

Figure 6:
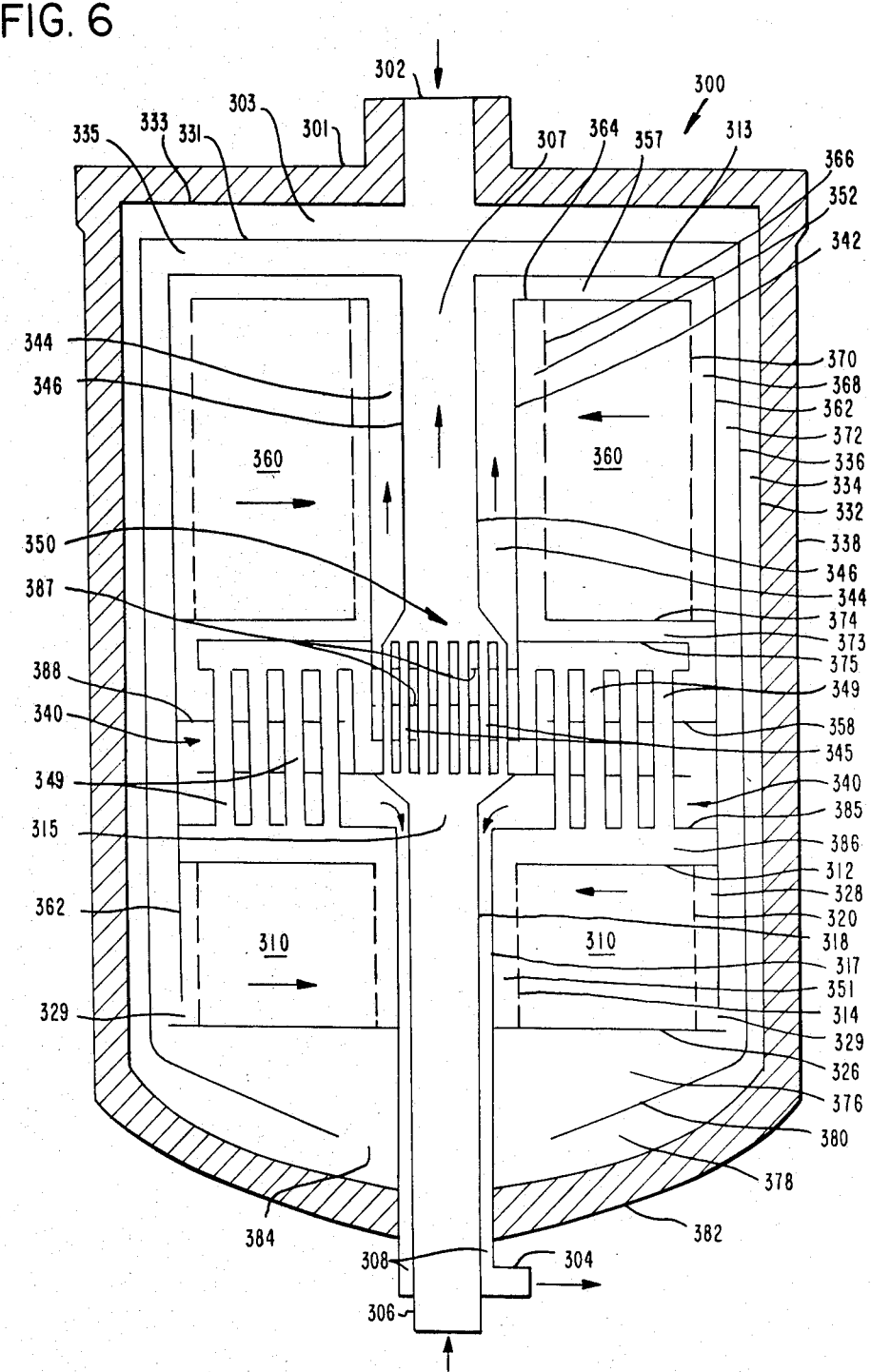
FIG. 6 is a sectional elevation flow diagram of a second embodiment of the reactor vessel of this invention.

Referring now to FIG. 6, another embodiment of the reactor vessel of the present invention is illustrated which is generally indicated at 300. As illustrated, reactor 300 comprises a cylindrical pressure-resistant shell 338 having an upper circular closure member 301 provided with a centrally-located aperture 302 through which gas feed enters the vessel into gas header space 303 defined by inner surface 333 of closure member 301 and upper cartridge closure plate 331 of reactor cartridge 336. At the lower-most end of reactor shell 338 is located a concentric tubular assembly comprising an outer tube 304 for removal of gas product from the reactor and an inner tube 306 for passage of additional quantities of gas feed to the reactor, both tubes 304 and 306 being arranged in an assembly, preferably coaxially with the cylindrical reactor. Reactor cartridge 336 is sized so as to provide an annular cooling channel 334 between the inner vertical surfaces 332 of reactor shell 338 and the outer vertical surfaces of cartridge 336. In addition, reactor cartridge 336 is sized so that the lower-most portion of reactor cartridge 336, comprising surfaces 380, defines (1) a lower gas space 378 beneath surfaces 380 and above the inner surface of lower portion 382 of shell 338, (2) a second gas space 376 above surfaces 380 and below lower catalyst plate 326 of lower catalyst bed 310, and (3) a gas opening 384 annularly arranged about the assembly of tubes 304 and 306, to allow feed gas to pass into second gas space 376 and then upwardly into inner annular gas space 372 for passage to first catalyst bed 310 via gas opening 329.

Within reactor cartridge 336 is positioned inner baffled cartridge 362 provided with upper closure member 313 and cylindrical vertical sheet 362. Upper closure member 313 of inner cartridge 362 is positioned below closure member 331 of outer reactor cartridge 336 in order to provide a second upper gas header space 335, which communicates centrally disposed gas passage 307 with inner annular gas channel 372, which is defined by, and located between, the cylindrical sheets defining the vertical surfaces of reactor cartridge 336 and inner baffled cartridge 362.

Substantially annular shaped upper catalyst bed 360, which comprises the second catalyst bed for treatment of the process stream, is provided with a circular upper catalyst plate 364 and a circular lower catalyst plate 374, which acts to support the catalyst within bed 360. The outer circumference of annular shaped catalyst bed 360 is defined by the adjacent vertical surfaces of baffled cartridge 362 and inner cylindrical sheet 342. In addition, catalyst bed 360 is provided with cylindrical outer gas permeable wall 370 and cylindrical inner gas permeable wall 366, which walls are secured to support plate 374. Outer gas permeable wall 370 defines an annular gas distribution channel 368 along the adjacent portion of the outer cylindrical sheet defining the vertical surface of baffled inner cartridge 362, and inner gas permeable wall 366 and inner cylindrical sheet 342 define gas withdrawal channel 352 which communicates with a lower gas space 373 positioned beneath lower catalyst plate 374 and upper baffle surface 375 of outer annular shaped, baffled reheat exchanger 340. Gas distribution channel 368 communicates with a third gas header space 357 which is itself defined by the upper surfaces of upper catalyst plate 364 and circular closure member 313 of baffled cartridge 362 to permit gases to pass outwardly, radially, through gas header space 357 to and then downwardly along gas distribution channel 368 for passage radially, inwardly, through catalyst bed 360 and ultimate withdrawal therefrom through permeable wall 366 into gas withdrawal channel 352, from which the withdrawn gases are passed outwardly through lower header space 373 and into the shell side of heat exchanger 340 wherein the second catalyst bed effluent gas is caused to flow a tortuous path therethrough by means of baffles 358 and wherein this effluent gas is heated by indirect heat exchange with the hotter effluent gas from first catalyst bed 310, to be described in more detail below. The thus-heated second catalyst bed effluent gas is withdrawn from the shell side of the exchanger 340 via annular product passage 308 (which is defined by outer wall 318 of feed tube 306 and outer surface 317 of product withdrawal tube 304) and ultimately removed from reactor shell 338 at the lower portion thereof via product tube 304.

Substantially annular shaped lower catalyst bed 310, which is substantially annularly shaped and comprises the first catalyst bed for treatment of the process stream in the apparatus of FIG. 6, is provided with upper circular catalyst plate 312 and lower catalyst plate 326, which acts to support the catalyst housed in bed 310. Lower catalyst bed 310 is provided with outer gas permeable wall 320 and inner gas permeable wall 314, each of which are substantially cylindrical in shape and which are secured to support plate 326. An annular gas distribution channel 328 is defined by outer gas permeable wall 320 and the adjacent portions of the outer cylindrical sheet which in turn defines the vertical surface of inner baffled cartridge 362, and in which opening 329 is provided, preferably at the lower portion thereof, to extend about the circumference of catalyst bed 310 in order to permit feed gases to pass into gas distribution channel 328 for passage radially, inwardly, through bed 310. Inner gas permeable wall 314 defines gas withdrawal channel 351 along the adjacent portions of the outer cylindrical surface 317 of product withdrawal tube 304. Gas withdrawal channel 351 receives the gas effluent from first catalyst bed 310 and passes these gases upwardly into gas space 386 defined by catalyst plate 312 and lower tubesheet 385 of reheat exchanger 340. From gas space 386 the first catalyst bed effluent gases enter tubes 349 for heating, by indirect heat exchange, of the gas effluent from second catalyst bed 360, as described above. The partially cooled first bed effluent gases are withdrawn from tubes 349 and are then passed into the shell side of baffled interbed heat exchanger 350 in which they are caused to flow a tortuous path by means of baffles 387 and in which these gases are further cooled by indirect heat exchange with fresh synthesis gas which is passed to the tube side of exchanger 350 from gas feed passage 315 to which this gas feed is introduced via feed tube 306. The further cooled effluent from catalyst bed 310 is withdrawn from the shell side of exchanger 350 via annular space 344 which is defined by the inner cylindrical sheet 342 of catalyst bed 360 and the outer cylindrical surfaces of center tube 346, which in turn communicates the tube side of heat exchanger 350 with second upper header space 335. The thus partially cooled first catalyst bed effluent is passed upwardly through upper annular space 344 to third header space 357 and then radially, outwardly, to gas distribution channel 368 and then downwardly as feed into second catalyst bed 360.

The partially heated feed gases withdrawn from tubes 345 of heat exchanger 350 are passed upwardly through tube 346 into gas space 307 and then into, and radially, outwardly through, second gas header space 335 from which the gases are passed downwardly into inner annular channel 372 in which the gases flow past upper catalyst bed 360 and reheat exchanger 340 and into opening 329 as feed to first catalyst bed 310.

A second portion of the synthesis gas feed to the reactor is introduced via aperture 302 into upper header space 303 from which it flows outwardly to annular cooling channel 334 and then into lower header space 376 and inner annular channel 372 as a portion of the feed to first catalyst bed 310 via opening 329.

Figure 7:
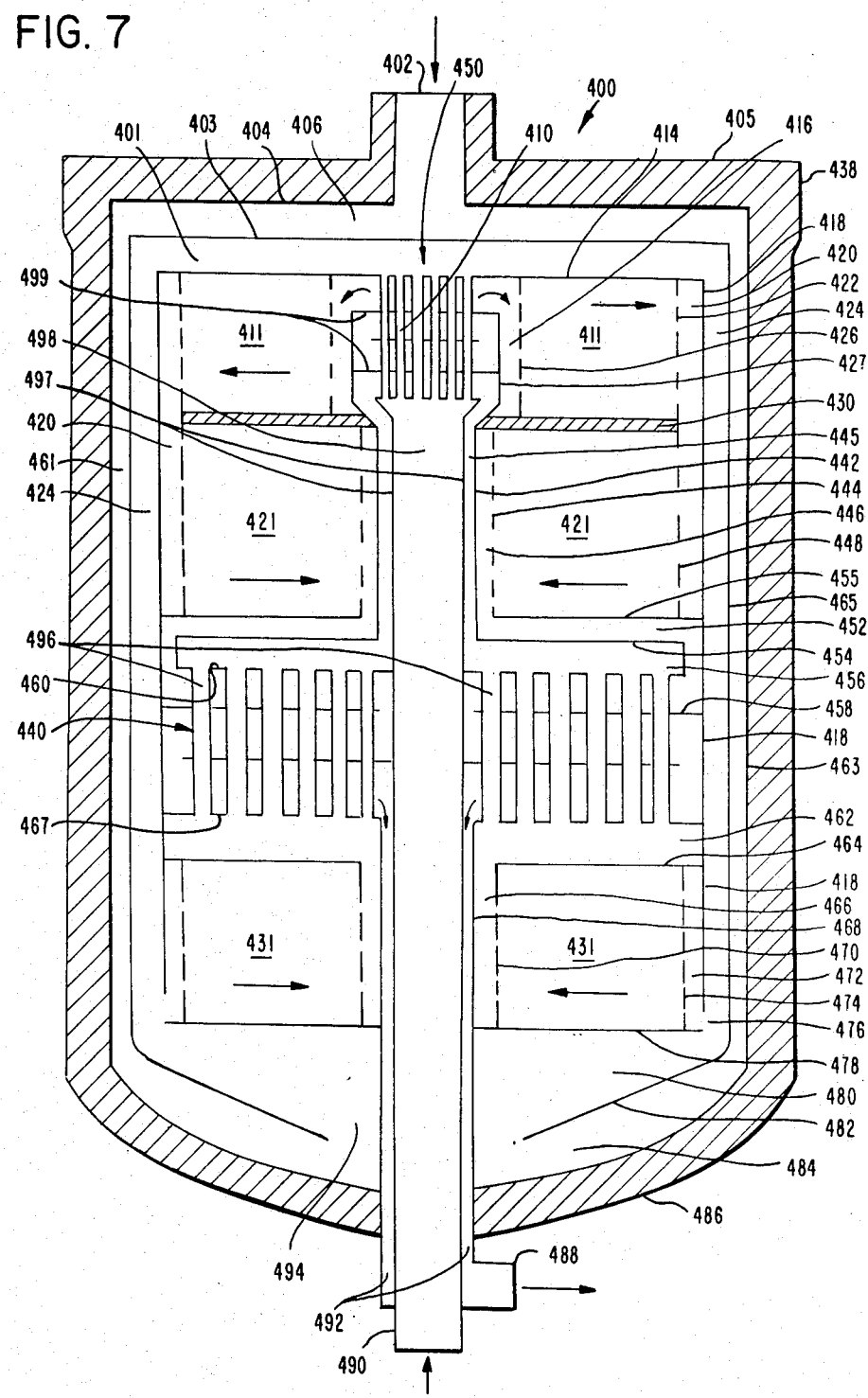
FIG. 7 is a sectional elevation flow diagram of a third embodiment of the reactor vessel of the present invention.

Referring now to FIG. 7, yet another embodiment of the reactor vessel of this invention, indicated generally at 400, is illustrated, which comprises a cylindrical pressure-resistant shell 438 which is provided with upper circular closure member 405 having a centrally positioned aperture 402 to permit gas feed to reactor 400. Within pressure shell 438 is positioned reactor cartridge 465 which is provided with upper circular closure member 403 defining upper header space 406 positioned beneath inner surface 404 of upper closure member 405. The outer, substantially-cylindrical vertical surfaces of reactor cartridge 465 define an annular gas cooling channel 461 within pressure shell 438 adjacent to the inner cylindrical surfaces 463 thereof. Reactor cartridge 465 is so sized as to provide a lower gas header space 484 above the lowermost portion 486 of pressure shell 438 and the lower surfaces 482 of reactor cartridge 465. Surfaces 482 also define gas passageway 494 which communicates with lower header space 484 and a second lower header space 480 positioned above surfaces 482 and beneath catalyst plate 478. In the lower portion 486 of pressure shell 438 is positioned the tubular assembly comprising an outer product tube 488 and an inner gas supply tube 490, which are preferably arranged coaxially about the vertical cylindrical axis of pressure shell 438 and which provide an annular gas space 492 between tubes 488 and 490 to permit product gases to be withdrawn from the shell side of reheat exchanger 440, as will be described in more detail below. Gas supply tube 490 is adapted to pass feed gas upwardly through the reactor and to supply this gas to the tube side 410 of upper exchanger 450, as will also be described in more detail below.

Within reactor cartridge 465 there is provided substantially cylindrical inner baffled cartridge 418 having upper closure plate 414 and catalyst support plate 478, and housing, in ascending order from the lower portions thereof above catalyst plate 478: first catalyst bed 431; a baffled, tubular reheat exchanger (indicated generally at 440); third catalyst bed 421; and second catalyst bed 411 in which is positioned, along the center axis thereof, a baffled tubular interbed heat exchanger (indicated generally at 450). Catalyst beds 431, 421 and 411 are annularly shaped and are positioned about the central axis of gas feed tube 490, which passes gas feed from the lower portion of reactor 400, upwardly through the innermost portions of the reactor to provide gas feed to the tube side 410 of upper, centrally positioned, interbed heat exchanger 450. Inner baffled cartridge 418 is sized so as to define a second upper header space 401 above plate 414 and below plate 403 and to define an inner annular gas channel 424 between the vertical outer surfaces of cartridge 418 and the adjacent portions of the vertical surfaces of reactor cartridge 465. Gas channel 424 communicates with second lower header space 480 and second upper header space 401 to permit gas feed to be passed to first catalyst bed 431, via opening 476, downwardly from second header space 401 and upwardly from lower gas space 480.

First, second and third catalyst beds 431, 411, and 421, respectively, and reheat exchanger 440 are substantially annular in shape and are positioned about the longitudinal axis of pressure shell 438. First catalyst bed 431 is defined by inner cylindrical sheet 468 and the adjacent cylindrical vertical surfaces of inner baffled cartridge 418, and is situated above catalyst plate 478 which acts to support the catalyst in bed 431. Bed 431 is also provided with outer gas permeable wall 474 and inner gas permeable wall 470, which are secured to support plate 478 and which are so positioned as to form annular gas distribution channel 472 and annular gas withdrawal channel 466 adjacent to the respective vertical sheets 418 and 468.

Similarly, third catalyst bed 421 is supported upon catalyst support plate 455 and is provided with an upper catalyst plate 430, outer gas permeable wall 448 and inner gas permeable wall 444, and annular gas distribution channel 420 and annular gas withdrawal channel 446 along the respective adjacent portions of the vertical cylindrical walls of inner baffled cartridge 418 and inner cylindrical sheet 442. Walls 444 and 448 are secured to support plate 455.

Second catalyst bed 411, comprising the upper catalyst bed in reactor 400, is provided with outer gas permeable wall 422 and inner gas permeable wall 426 and is supported by plate 430 to which walls 422 and 426 are secured. The upper portions of catalyst bed 411 are defined by circular closure plate 414. Annular gas distribution channel 416 is provided between inner gas permeable wall 426 and outer cylindrical sheet 427 defining the outer surfaces of upper exchanger 450, in order to permit gas feed to second catalyst bed 411 from exchanger 450. The gases fed to bed 411 pass therethrough radially, outwardly and exit through outer gas permeable wall 422 into annular gas channel 420 for feed downwardly into third catalyst bed 421, through which the gas is passed radially, inwardly.

Reheat exchanger 440 is provided with tubes 496 which communicate with lower gas space 462, positioned below tubesheet 467 and above closure plate 464, and with a second gas space 456, positioned above tubesheet 460 and beneath a circular channel guide 454 to permit gases exiting from first catalyst bed 431 via gas withdrawal channel 466 to pass into gas space 462 and then upwardly through the tube side 496 of reheat exchanger 440 for indirect heat exchange with and heating of the product gases withdrawn via gas withdrawal channel 446 from third catalyst bed 421. Reheat exchanger 440 is also provided with baffles 458, which cause the product gases entering the shell side of exchanger 440 via gas space 452 to flow a tortuous path through exchanger 440 for indirect heat exchange with, and heating by, the effluent gases from first catalyst bed 431. The product gases which are thus heated are withdrawn from exchanger 440 via annular product passage 492, which is positioned between gas product tube 488 and the outer surfaces of gas feed tube 490. These product gases are withdrawn from reactor 400 via product tube 488. An annular gas passage 445 is provided between the inner cylindrical sheet 442 of bed 421 and the adjacent portions of gas feed tube walls 497 and communicates gas space 456 with the shell side of exchanger 450 to permit gases to pass from tubes 496 of reheat exchanger 440 to interbed exchanger 450, as will be described in more detail below.

Upper, interbed exchanger 450 is centrally positioned about the longitudinal axis of reactor shell 438, and is provided with tubes 410 for communication of gas feed from gas feed passage 498 within gas feed tube 490 and second header space 401 and for heating of this gas feed therein by indirect heat exchange with the partially cooled gas effluent from first catalyst bed 431 which is passed thereto via annular gas passage 445. Baffles 499 within upper exchanger 450 provide a tortuous passage for the partially cooled first catalyst bed effluent gas to flow therethrough for indirect heat exchange with, and heating of, this portion of the gas feed to the reactor.

In operation, a first portion of the gas feed is introduced via heat tube 490 and passed upwardly through center feed passage 498 to upper exchanger 450 in which this gas is heated with partially cooled first catalyst bed effluent which is introduced to the shell side of exchanger 450 via inner annular gas passage 445. The thus-heated gas feed is withdrawn from tube side 410 of exchanger 450 into second header space 401 and passed outwardly through header space 401 to, and downwardly along, inner annular gas channel 424 to the lower portion of inner baffled cartridge 418 to opening 476 (which is positioned about the circumference of the cylindrical cartridge 418 for feed of this gas to gas passage 472) and thence radially, inwardly, through first catalyst bed 431. The thus-reacted gases are then withdrawn to the tube side 496 of reheat exchanger 440 for heating of the effluent gases from third catalyst bed 421 and for subsequent passage to the shell side of upper heat exchanger 450 for preheating of gas feed as described above. From the shell side of upper exchanger 450 the first bed effluent gases are passed to annular gas distribution channel 416 and thence radially, outwardly through catalyst bed 411 wherein they are further reacted. Product gases exit second catalyst bed 411 into annular gas channel 420 and are then introduced to third catalyst bed 421 through which these gases flow radially, inwardly. The product gases from third catalyst bed 421 are withdrawn via gas channel 446 and gas space 452 to the shell side of reheat exchanger 440 for heating of these gases before being withdrawn as product via tube 488.

A second portion of the gas feed is introduced via upper aperture 402 to upper header space 406 in which the gases flow radially outwardly to, and then downwardly along, annular cooling channel 461, after which the gases enter, sequentially, lower header space 484 and second lower header space 480 for ultimate passage to the lower portion of inner gas channel 424 as part of the feed to first catalyst bed 431.

It will be recognized that the three catalyst beds in the embodiment of FIG. 7 are actually representative of two catalyst stages since essentially no heat removal for temperature control is intentionally accomplished between second catalyst bed 411 and third catalyst bed 421, so that beds 411 and 421 can be viewed as comprising one catalyst stage. FIG. 7, therefore, illustrates that interbed heat removal is not required between each and every catalyst bed in accordance with this invention where, for example, dictates of construction require that a single catalyst stage be separated into two or more catalyst beds.

Figure 8:
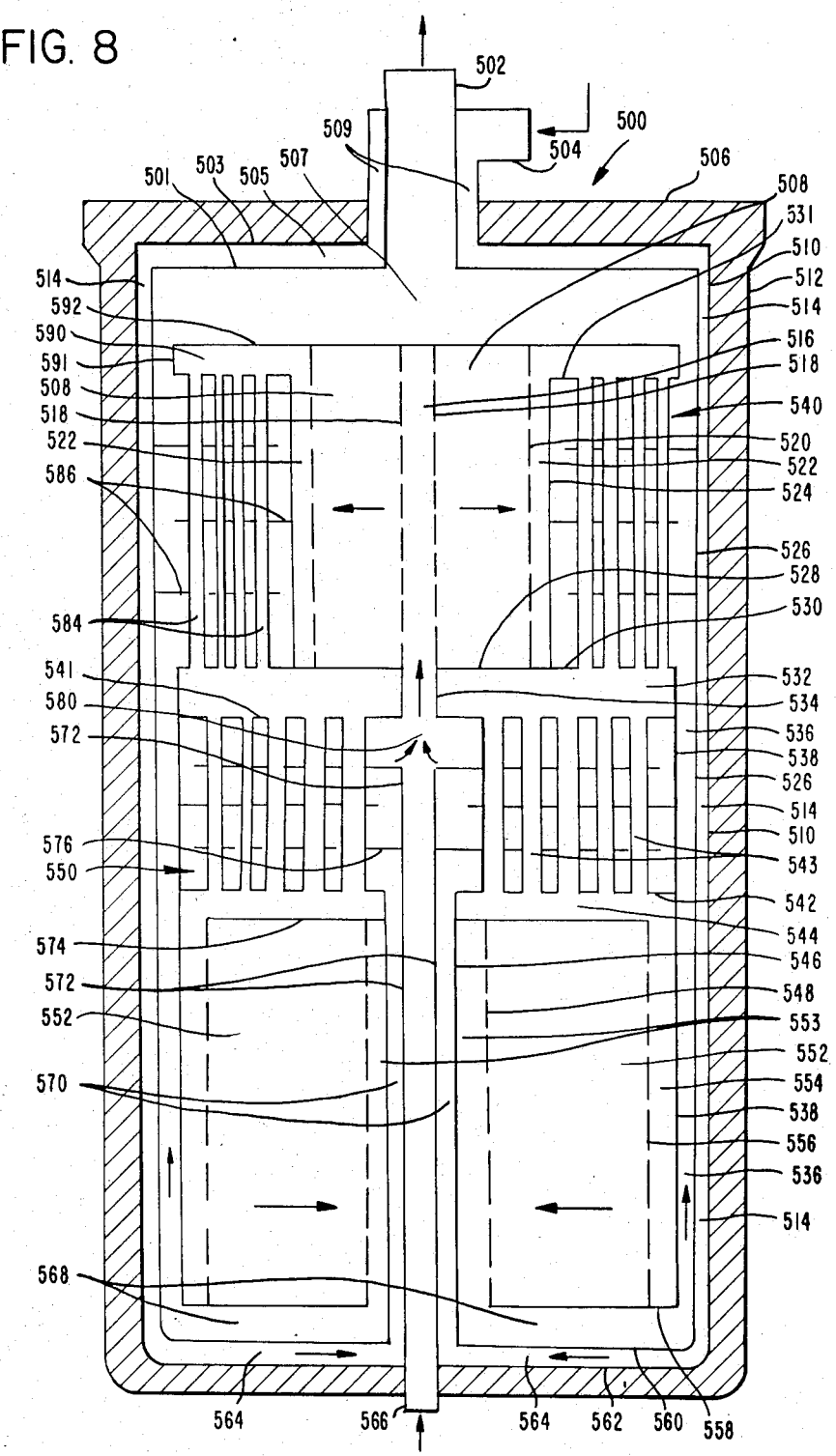
FIG. 8 is a sectional elevation flow diagram of a fourth embodiment of the reactor vessel of the present invention.

Referring now to FIG. 8, another embodiment of the apparatus of this invention (indicated generally at 500) is illustrated which comprises cylindrical pressure-resistant shell 512 having upper closure member 506 provided with a centrally positioned gas feed/product assembly having an outer gas feed tube 504 and an inner gas product tube 502. Tubes 502 and 504 are preferably positioned concentrically about the vertical cylindrical axis of pressure shell 512 and provide annular gas passage 509 which communicates with upper header space 505. Within pressure shell 512 there is positioned cylindrical reactor cartridge 526 having an upper closure plate 501 and a lower support plate 560. Cartridge 526 is sized so as to provide (1) annular gas cooling channel 514 along the adjacent vertical cylindrical inner walls 510 of pressure shell 512, (2) upper header space 505 above upper closure plate 501 and below inner surface 503 of circular closure member 506, and (3) lower header space 564 below lower support plate 560 and above lower inner surface 562 of pressure shell 512.

At the lower portion of pressure shell 512 there is positioned a second gas feed tube 566, preferably located along the vertical cylindrical axis of pressure shell 512 for introducing feed gases into upper catalyst bed 508, as will be described in more detail below. Within reactor cartridge 526 there is positioned, in ascending order from the lower portions thereof: second catalyst bed 552; interbed heat exchanger 550; and first catalyst bed 508, which is positioned about the vertical cylindrical axis of pressure shell 512 and within an annular-shaped reheat exchanger 540.

Second catalyst bed 552 is annularly shaped and is situated upon catalyst support plate 558 which acts to support the catalyst within bed 552, and which is positioned to form second lower gas space 568 below plate 558 and above support plate 560 of reactor cartridge 526. Bed 552 is also provided with inner gas permeable wall 548, inner cylindrical sheet 546, outer gas permeable wall 556 and upper closure plate 574. Walls 548 and 556 are secured to support plate 558. Annular gas withdrawal channel 553 is provided between inner gas permeable walls 548 and inner cylindrical sheet 546. Annular gas distribution channel 554 is provided between outer gas permeable walls 556 and the adjacent portion of outer cylindrical sheet 538. Outer cylindrical sheet 538 extends upwardly to also define the outer walls of exchanger 550 and to provide second annular gas passage 536 between sheet 538 and the adjacent portions of the inner vertical cylindrical surfaces of reactor cartridge 526. Gases exiting catalyst bed 552 are collected in inner gas channel 553 and flow downwardly, through gas space 568, and then upwardly into annular gas space 536 to the shell side of reheat exchanger 540, as will be described in more detail below. Inner cylindrical sheet 546 is itself positioned to provide inner annular gas passage 570 between sheet 546 and the outer wall 572 of second gas feed tube 566. Inner annular gas channel 570 communicates with lower header space 564 and the shell side of centrally positioned interbed heat exchanger 550 for further heating, as will also be described in more detail below.

Heat exchanger 550 comprises gas tubes 543 which are adapted to receive heating fluid from gas space 532, flow baffles 576, upper tubesheet 541 and lower tubesheet 542. Exchanger 550 is adapted to receive feed gas from inner annular gas passage 570 into the shell side of exchanger 550 wherein this gas is caused to flow a tortuous path about tubes 543 for heating by indirect heat exchange with partially cooled gas effluent from catalyst bed 508 which is passed to tubes 543. A gas space 544 is provided between tubesheet 542 and closure plate 574 to receive gases exiting tubes 543 and to pass these gases to gas distribution channel 554 for feed to second catalyst bed 552. A second gas space 532 is provided above tubesheet 541 of exchanger 550 to receive the partially cooled first catalyst bed effluent from the tube side 584 of reheat exchanger 540 and for passage of this gas to the tube side 543 of exchanger 550. The heated feed gas is withdrawn from the shell side of exchanger 550 into center gas space 580 wherein this heated feed gas is combined with the second portion of the feed gas which is passed upwardly through gas feed tube 566 from the lower portion of pressure shell 512. This combined feed gas stream then enters intermediate tube 534 which connects gas space 580 with a center gas distribution passage 516 for feed of these gases to first catalyst bed 508.

First catalyst bed 508 is annularly shaped and is provided with upper closure plate 592, outer gas permeable wall 520 and inner gas permeable wall 518, which are secured to a support plate 528. A centrally positioned gas distribution channel 516 is provided inside bed 508 for distribution of feed gas from intermediate tube 534 radially, outwardly, through catalyst bed 508, and annular gas withdrawal channel 522 is provided between outer gas permeable walls 520 and the inner vertical sheet 524 of reheat exchanger 540 to collect gas effluent from first bed 508 for introduction to reheat exchanger 540.

Baffled reheat exchanger 540 is annularly shaped and positioned about the longitudinal axis of pressure shell 512 and surrounds first catalyst bed 508. First exchanger 540 is provided with gas tubes 584, flow baffles 586 and lower tubesheet 530 and is adapted to receive first catalyst bed effluent gas from gas withdrawal channel 522 into an upper gas space 590, positioned above tubesheet 531 and beneath upper closure plate 592 which extends to enjoin a closure channel surface 591. Exchanger 540 is also adapted to receive into its shell side, from the lower portion of exchanger 540, second catalyst bed effluent gas which is passed thereto from inner annular gas passage 536 and which is caused to flow a tortuous path through exchanger 540 by means of baffles 586 for heating by indirect heat exchange with the first catalyst bed effluent gas which flows through tubes 584. The thus-heated second catalyst bed effluent gas is withdrawn from the shell side of exchanger 540 into upper header space 507 and is then withdrawn from reactor 500 via product tube 502. Partially cooled first catalyst bed effluent gas is withdrawn from tubes 584 and passed to gas space 532 for introduction into the tube side of second exchanger 550, as described above.

In operation, a first portion of the gas feed is passed via feed tube 504 to provide annular cooling gas in channel 514 to cool reactor shell 512. This annular cooling gas passes from cooling channel 514 to gas spaces 564 and inner gas channel 570 and enters the shell side of heat exchanger 550 in which the gas feed is further heated by indirect heat exchange with a partially cooled first catalyst bed effluent, after which the further heated feed gas is combined in zone 580 with a second portion of the gas feed, which is passed upwardly to zone 580 via gas feed tube 566, and then introduced via tube 534 to feed passage 516 for feed to first catalyst bed 508. The gas passes through bed 508 radially, outwardly, and the reacted gas is withdrawn as gas effluent into channel 522 and then passed via gas space 590 into heat exchange tubes 584 for final heating of the gas effluent from second catalyst bed 552.

The partially cooled first catalyst bed effluent gas withdrawn into gas space 532 from reheat exchanger 540 is then passed to tubes 543 of interbed exchanger 550 for the preheating of the annular gas feed, and the further cooled first catalyst bed effluent is collected in gas space 544 and passed to gas distribution channel 554 for feed, radially, inwardly, to second catalyst bed 552. Product gases are withdrawn from bed 552 into gas withdrawal channel 553 and then passed via gas space 568 and gas channel 536 to the shell side of reheat exchanger 540 for final heating and for ultimate withdrawal from reactor 500 via gas header space 507 and gas product tube 502 as described above.

Figure 9:
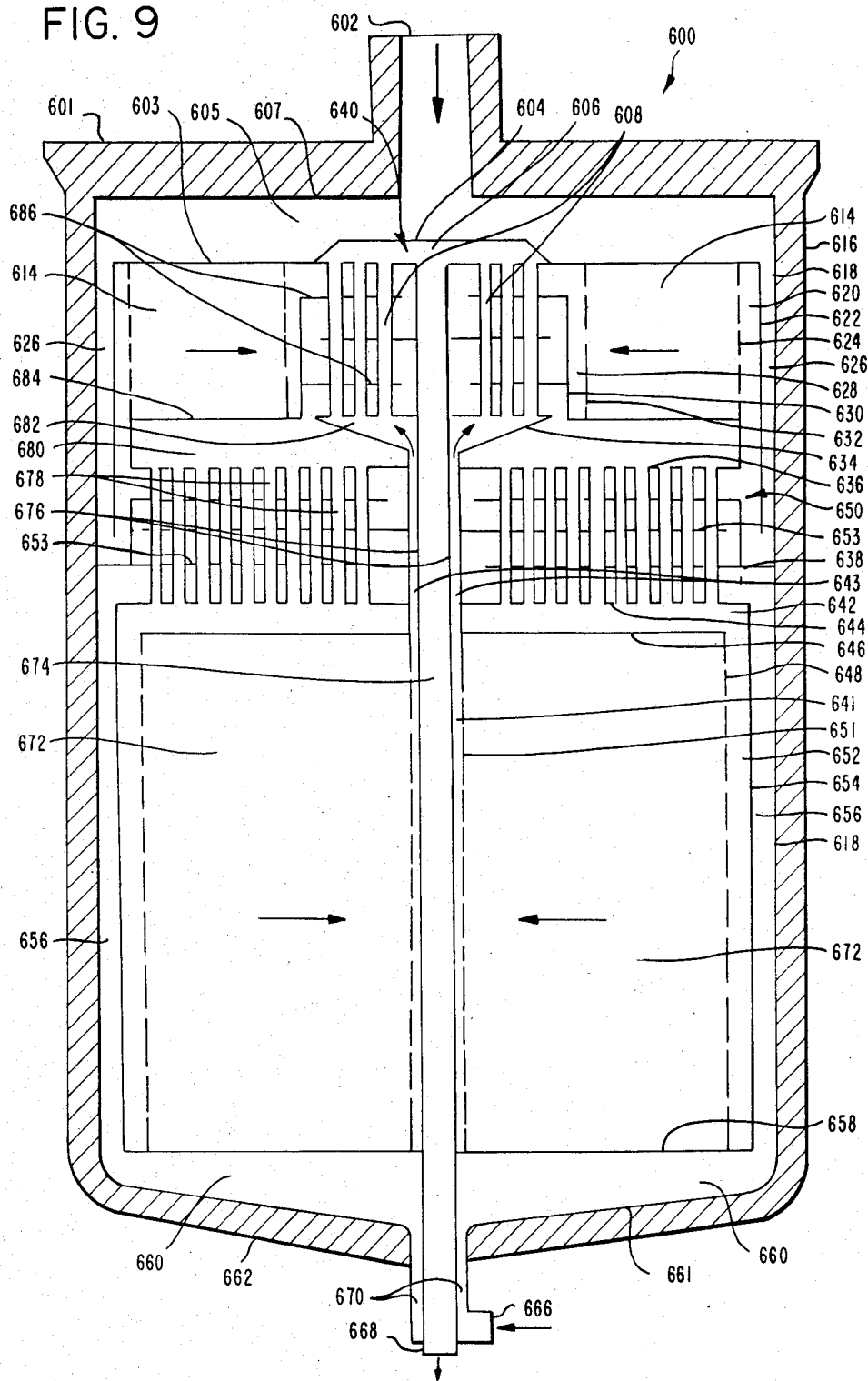
FIG. 9 is a sectional elevation flow diagram of a fifth embodiment of the reactor vessel of the present invention.

Referring now to FIG. 9, yet another embodiment of the reactor apparatus of this invention (indicated generally at 600) is illustrated which comprises a cylindrical pressure-resistant shell 616 which is provided with an upper circular closure member 601 having a centrally positioned aperture 602 communicating with gas header space 605 located below inner surfaces 607 of closure member 601. Within pressure shell 616 is positioned: (1) in the upper portion thereof, first reactor cartridge 622 (which houses first catalyst bed 614 and baffled reheat exchanger 640); and (2) in the lower portion thereof, second reactor cartridge 654 (which houses second catalyst bed 672). A baffled, interbed heat exchanger 650 is positioned in pressure shell 616 between first reactor cartridge 622 and second reactor cartridge 654 and is adapted to provide gaseous communication there between as will be described in more detail below.

First reactor cartridge 622 is sized so as to provide gas header space 605 thereabove and to provide first annular cooling channel 626 between cartridge 622 and the adjacent portions of the inner cylindrical vertical surfaces 618 of pressure shell 616. Similarly, second reactor cartridge 654 is sized so as to provide lower header space 660, beneath catalyst support plate 658 and above the lower inner surface 661 of lower portion 662 of pressure shell 616, and a second annular cooling channel 656 between cartridge 654 and the adjacent portions of the inner vertical cylindrical surfaces 618 of reactor shell 616. First annular cooling channel 626 is adapted to receive gases from upper header space 605 for feed to first catalyst bed 614 and is separated from gas channel 656 by means of circumferential seal baffle 638.

Reheat exchanger 640 is positioned within first catalyst bed 614, which is annularly shaped, and catalyst bed 614 and exchanger 640 are each arranged about the vertical cylindrical axis of pressure shell 616. Catalyst bed 614 is supported upon catalyst support plate 684 and is enclosed along its upper surface by closure member 603. Bed 614 is provided with outer gas permeable wall 624 and inner gas permeable wall 632, which are secured to support plate 684. An annular gas distribution channel 620 is defined between outer gas permeable wall 624 and the adjacent portions of the cylindrical sheet forming the inner vertical surfaces of first reactor cartridge 622. An inner annular gas withdrawal channel 628, is defined between inner gas permeable wall 632 and inner cylindrical sheet 630, which comprises the outer vertical wall of exchanger 640. Gas withdrawal channel 628 is adapted to pass the effluent gas from first catalyst bed 614 to the shell side of reheat exchanger 640 for indirect heat exchange with, and heating of, the effluent gases from the second catalyst bed 672, as will be described in more detail below.

Exchanger 640 comprises tubes 608, flow baffles 686, upper closure sheet 604 and lower concave baffle 634. Upper closure sheet 604 provides a gas space 606 to collect gases exiting from the tube side 608 for passage to the upper portion of product tube 668 for withdrawal of the product gases from the reactor via longitudinal gas passage 674 as shown. Lower concave baffle 634 defines conical gas space 682 which is adapted to receive the gaseous effluent from second catalyst bed 672 via annular gas passage 643 for introduction of these gases to tubes 608. Baffles 686 cause the first catalyst bed effluent gas to flow a tortuous path through exchanger 640. Exchanger 640 is adapted to permit the partially cooled first catalyst bed effluent gases to be withdrawn from the shell side of exchanger 640 into lower gas space 680 (which is located below catalyst support plate 684 and concave baffle 634 and above upper tubesheet 636 of second exchanger 650) for passage into tubes 678 of second exchanger 650.

Interbed exchanger 650 comprises tubes 678, flow baffles 653, upper tubesheet 636 and lower tubesheet 644. Exchanger 650 is sized so as to provide an inner annular gas passage 643 along the adjacent portions of outer wall 676 of gas product tube 668, to provide gaseous communication between inner withdrawal channel 641 of second bed 672 and conical gas space 682 of reheat exchanger 640. Tubesheet 644 and upper closure plate 646 of catalyst bed 672 define gas space 642 for collection of gases from tubes 678 and for passage of these gases to gas distribution channel 652 for feed to second catalyst bed 672. Tubes 678 communicate gas space 680 with gas space 642 for passage of partially cooled first catalyst bed effluent gas through exchanger 650. Exchanger 650 is adapted to receive annular cooling gases into the shell side thereof, and baffles 653 are arranged so as to cause the annular cooling gas to flow a tortuous path about the external surfaces of tubes 678 for heating by indirect heat exchange with the hotter gases in tubes 678.

In second catalyst cartridge 654 there is provided second catalyst bed 672 which is substantially annular in shape and is positioned about the vertical cylindrical axis of pressure shell 616. Bed 672 is supported by catalyst support plate 658 and is provided with outer gas permeable wall 648 and inner gas permeable wall 651, each of which is secured to support plate 658. A closure member 646 defines the upper bounds of catalyst bed 672. A substantially annular shaped gas distribution channel 652 is provided between outer gas permeable wall 648 and the adjacent vertical cylindrical sheet which defines the vertical surfaces of second catalyst cartridge 654 to permit gases to be distributed as feed to catalyst bed 672 along the length thereof. A gas collection channel 641 is also provided as a substantially annular shaped channel between inner gas permeable wall 651 and the adjacent portions of the cylindrical outer surfaces 676 of gas product tube 668. Gas collection channel 641 communicates with annular gas passage 643 for passage of the second bed effluent gas to the tube side of reheat exchanger 640 for heating by indirect heat exchange with the effluent gases from first catalyst bed 614.

Lower portion 662 of pressure shell 616 is provided with concentrically positioned inner gas product tube 668 and outer gas feed tube 666, each of which are positioned about the vertical cylindrical axis of pressure shell 616. Outer gas feed tube 666 defines an annular shaped gas feed channel 670 which communicates with lower header space 660 which in turn communicates with second annular cooling gas channel 656 for cooling of the adjacent lower portions of pressure shell 616 and for feeding of these annular gases to the shell side of interbed exchanger 650, wherein the gases are further heated by indirect heat exchange with partially cooled first catalyst bed effluent gas, as described above.

In operation, a first portion of the gas feed is passed via aperture 602 into upper header space 605 and thence outwardly to, and downwardly along, annular cooling channel 626 to the lower portion of gas distribution channel 620 at which point these annular cooling gases are combined with gases exiting the shell side of exchanger 650 for feed to first catalyst bed 614. A second portion of the gas feed is passed via feed tube 666 and annular gas passage 670 to lower header space 660 and thence to second annular cooling channel 656, followed by introduction into the shell side of exchanger 650 for further heating by contact with partially cooled first catalyst bed effluent gases. The thus-heated annular cooling gases are withdrawn from the shell side of exchanger 650 and combined with the remaining gas feed in gas distribution channel 620, as described above, for feed to first catalyst bed 614.

The gas effluent exiting first catalyst bed 614 is collected in gas channel 628 and passed to the shell side of reheat exchanger 640 for heating of the product gases withdrawn from second catalyst bed 672. The partially cooled first catalyst bed effluent gases are passed to the lower gas space 680 and then to the tube side of exchanger 650 for preheating of the annular cooling gases passed thereto from second annular cooling channel 656, as described above. The first catalyst bed effluent gases are withdrawn from tubes 678 of exchanger 650 and then passed via gas space 642 to gas distribution channel 652 for feed to second catalyst bed 672.

Product gases withdrawn from second catalyst bed 672 are collected in channel 641 and passed upwardly via inner annular gas passage 643 and gas space 682 to tubes 608 of reheat exchanger 640 for heating by indirect heat exchange with first catalyst bed effluent gas. The thus heated second catalyst bed effluent gases are withdrawn from the reactor via product tube 668.

Figure 10:
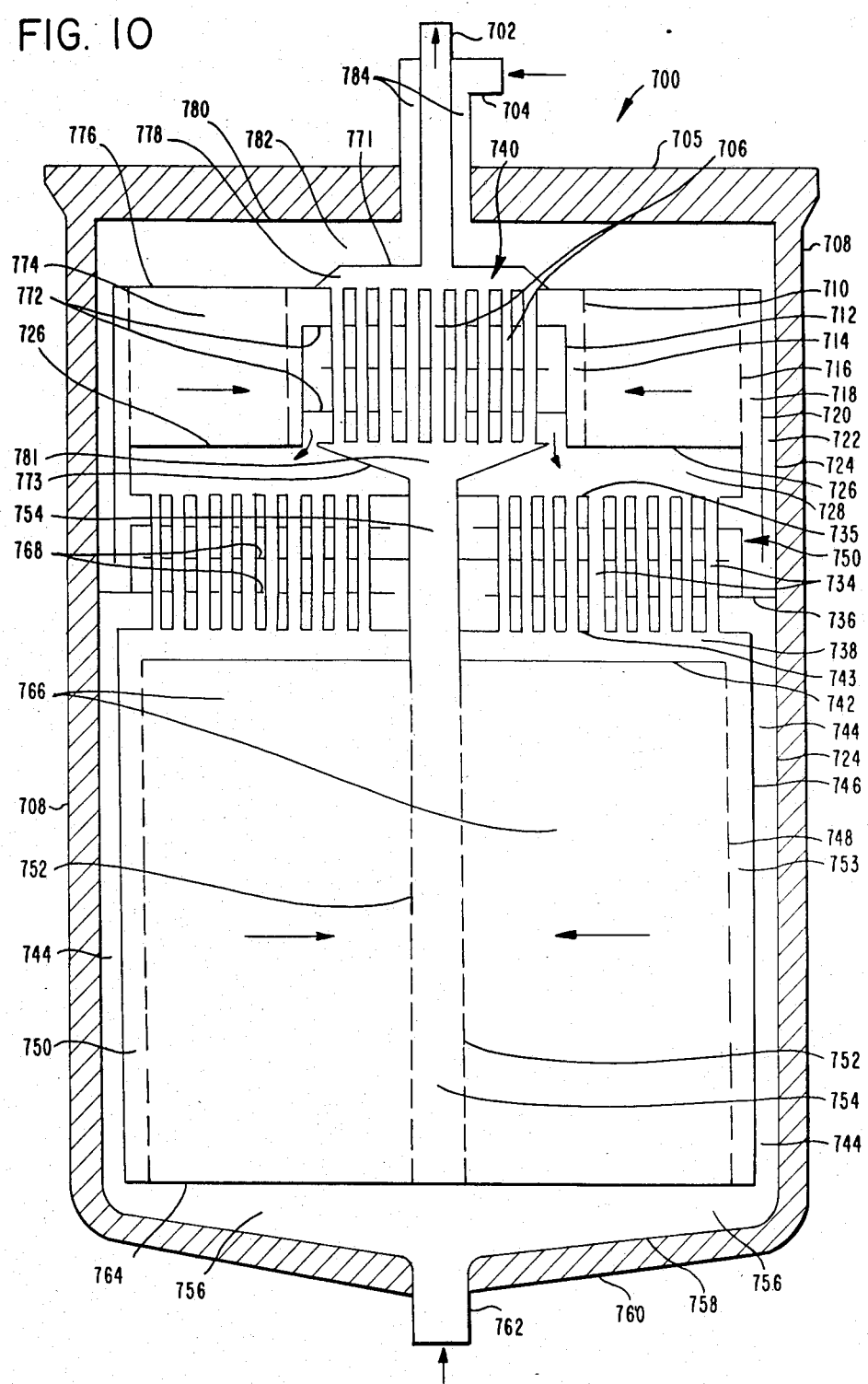
FIG. 10 is a sectional elevation flow diagram of a sixth embodiment of the reactor vessel of the present invention.

Referring now to FIG. 10, yet another embodiment of the apparatus of this invention is illustrated which is indicated generally at 700. Reactor 700 comprises substantially cylindrical pressure-resistant shell 708 which is provided with a circular upper closure member 705 having a centrally positioned tubular assembly comprising an inner gas product tube 702 and an outer gas feed tube 704, each of which are positioned about the vertical cylindrical axis of pressure shell 708. Outer gas feed tube 704 defines an annular shaped gas channel 784 which communicates with an upper header space 782 provided below the inner surface 780 of upper closure member 705.

Within pressure shell 708 is positioned: (1) in the upper portion thereof, first reactor cartridge 720 (which houses first catalyst bed 774 and baffled reheat exchanger 740) and (2) in the lower portion thereof, second reactor cartridge 746 (which houses second catalyst bed 766). A baffled interbed heat exchanger 750 is positioned in pressure shell 708 between first reactor cartridge 720 and second reactor cartridge 746 and is adapted to provide gaseous communication therebetween as will be described in more detail below.

First reactor cartridge 720 is sized so as to provide gas header space 782 thereabove and to provide first annular cooling channel 722 between cartridge 720 and the adjacent portions of the inner cylindrical vertical surfaces 74 of pressure shell 708. Similarly, second reactor cartridge 746 is sized so as to provide lower header space 756, beneath catalyst support plate 764 and above the lower inner surface 758 of lower portion 760 of pressure shell 708, and a second annular cooling channel 744 between cartridge 746 and the adjacent portions of the inner vertical cylindrical surfaces 724 of reactor shell 708. First annular cooling channel 722 is adapted to receive gases from upper header space 782 for feed to first catalyst bed 774 and is separated from gas channel 744 by means of circumferential seal baffle 736.

Reheat exchanger 740 is positioned within first catalyst bed 774, which is annularly shaped, and catalyst bed 774 and exchanger 740 are each arranged about the vertical cylindrical axis of pressure shell 708. Catalyst bed 774 is supported upon catalyst support plate 726 and is enclosed along its upper surface by closure member 776. Bed 774 is provided with outer gas permeable wall 716 and inner gas permeable wall 710, each of which is secured to support plate 726. An annular gas distribution channel 718 is defined between outer gas permeable wall 716 and the adjacent portions of the cylindrical sheet forming the inner vertical surfaces of first reactor cartridge 720. An inner annular gas withdrawal channel 714, is defined between inner gas permeable wall 710 and inner cylindrical sheet 712, which comprises the outer vertical walls of first exchanger 740. Gas withdrawal channel 714 is adapted to pass the effluent gas from first catalyst bed 774 to the shell side of exchanger 740 for indirect heat exchange with, and heating of, the effluent gases from the second catalyst bed 766, as will be described in more detail below.

Reheat exchanger 740 comprises tubes 706, flow baffles 772, upper closure sheet 771 and lower concave baffle 773. Upper closure sheet 771 provides a gas space 778 to collect gases exiting from the tube side 706 for passage to the lower portion of product tube 702 for withdrawal of the product gases from the reactor as shown. Lower concave baffle 773 defines lower conical gas space 781 which is adapted to receive the gaseous effluent from second catalyst bed 766 via longitudinal gas passage 754 for introduction of these gases to tubes 706. Baffles 772 cause the first catalyst bed effluent gas to flow a tortuous path through exchanger 740. Exchanger 740 is adapted to permit the partially cooled first catalyst bed effluent gases to be withdrawn from the shell side of exchanger 740 into lower gas space 728 (which is located below catalyst support plate 726 and concave baffle 773 and above upper tubesheet 735 of interbed exchanger 750) for passage into tubes 734 of exchanger 750.

Interbed exchanger 750 comprises tubes 734, flow baffles 768, upper tubesheet 735 and lower tubesheet 743. Exchanger 750 is annular shaped and positioned about inner longitudinal gas passage 754. Tubesheet 743 and upper closure plate 742 of catalyst bed 766 define gas space 738 for collection of gases from tubes 734 and for passage of these gases to gas distribution channel 753 for feed to second catalyst bed 766. Tubes 734 communicate gas space 728 with gas space 738 for passage of partially cooled first catalyst bed effluent gas through exchanger 750. Exchanger 750 is adapted to receive annular cooling gases into the shell side thereof, and baffles 768 are arranged so as to cause the annular cooling gas to flow a tortuous path about the external surfaces of tubes 734 for heating by indirect heat exchange with the hotter gases in tubes 734.

In second catalyst cartridge 746 there is provided second catalyst bed 766 which is substantially annular in shape and is positioned about the vertical cylindrical axis of pressure shell 708. Bed 766 is provided with outer gas permeable wall 748 and inner gas permeable wall 752, each of which is secured to catalyst support plate 764. A closure member 742 defines the upper bounds of catalyst bed 766. A substantially annular shaped gas distribution channel 753 is provided between outer gas permeable wall 748 and the adjacent vertical cylindrical sheet which defines the vertical surfaces of second catalyst cartridge 746 to permit gases to be distributed as feed to catalyst bed 766 along the length thereof. A substantially cylindrically shaped, longitudinal gas passage 754 is also provided within bed 766 and is defined by inner gas permeable wall 752.

A centrally positioned aperture 762 is provided in lower portion 760 of pressure shell 708 to permit gas feed to be introduced into lower header space 756.

In operation, a first portion of a gas feed is passed via aperture 762 into lower header space 756 and thence outwardly to, and upwardly along, annular cooling channel 744 to the shell side of exchanger 750 wherein these annular gases are further heated by indirect heat exchange with partially cooled first catalyst bed effluent gas which is passed through tubes 734. The thus heated annular gases are withdrawn from the shell side of exchanger 750 and combined with the remaining portion of the feed gas for passage to annular distribution channel 718 as feed along the outer portion of first catalyst bed 774. A second portion of the gas feed is passed via feed tube 704 and annular gas passage 784 to upper header space 782 and thence to upper annular cooling channel 722, from which this portion of the annular feed gases are combined with the gases exiting the shell side of exchanger 750 and fed, as described above, to first first catalyst bed 774.

The first catalyst bed effluent gas is withdrawn via gas collection channel 714 and passed to the shell side of exchanger 740 wherein the first catalyst bed gas effluent imparts at least a portion of its heat to second catalyst bed effluent gas which is passed through tubes 706 of exchanger 740. Thereafter, the partially cooled first catalyst bed effluent gas is introduced to tubes 734 of exchanger 750, as described above, from which these gases are withdrawn into gas space 738 and distributed along gas channel 753 as radial, inward feed to second catalyst bed 766 for additional reaction. The product gases withdrawn from second bed 766 into centrally positioned, longitudinal gas passage 754 and upwardly past exchanger 750 into tubes 706 of exchanger 740 for final heating of the second bed effluent gas as described above. The thus heated product gases are withdrawn from reactor 700 via product tube 702.

Figure 11:
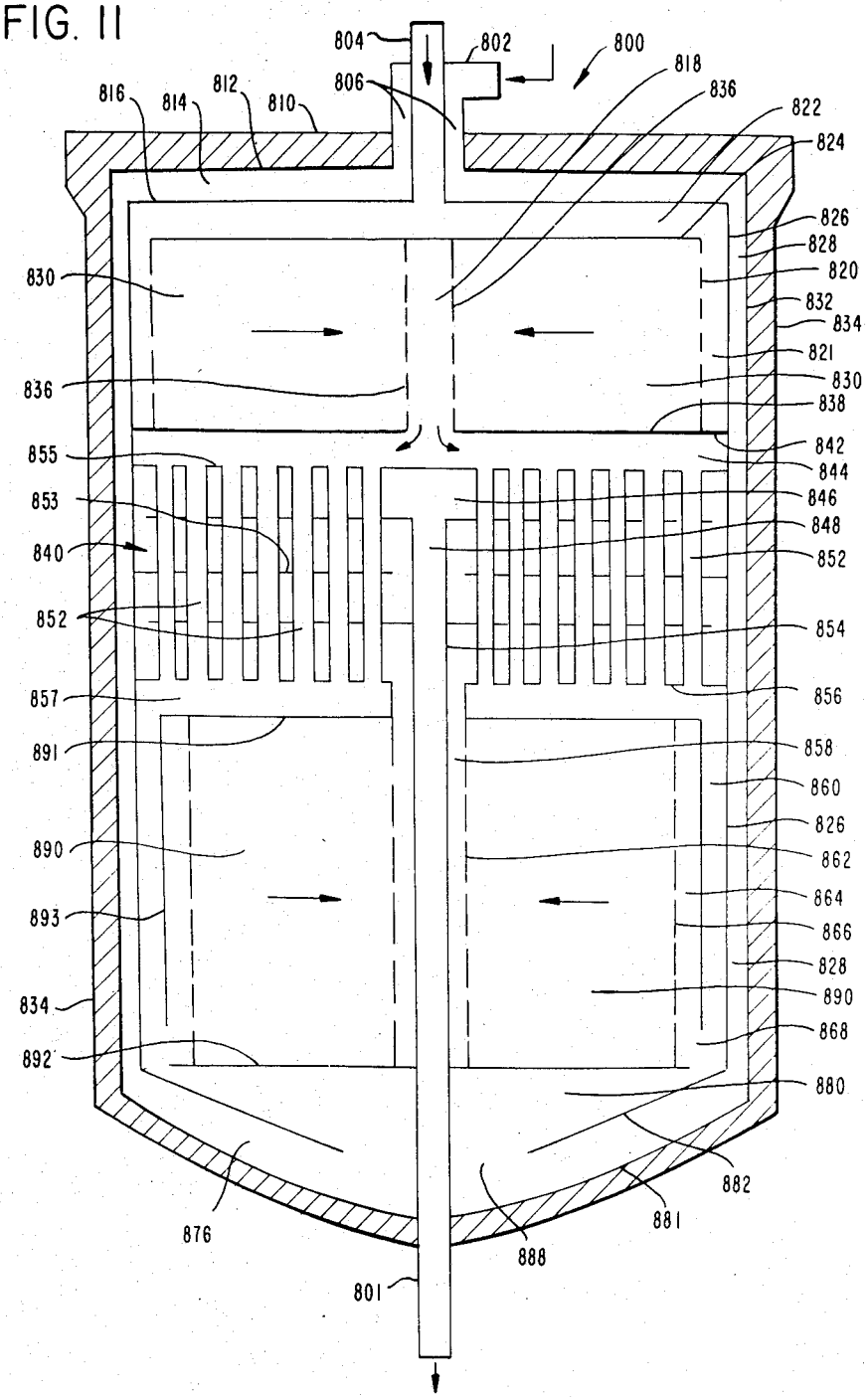
FIG. 11 is a sectional elevation flow diagram of a seventh embodiment of the reactor vessel of the present invention employing quench gas for cooling of reheat exchanger effluent prior to the second catalyst bed.

Referring now to FIG. 11, yet another embodiment of the apparatus of this invention (indicated generally at 800), based on a quench configuration, is illustrated which comprises a cylindrical pressure-resistant shell 834 which is provided with an upper circular closure member 810 having a centrally positioned tubular assembly comprising concentrically arranged tubes 802 and 804 communicating with gas header spaces 814 and 822, respectively, as will be described in more detail below. Within reactor shell 834 is positioned substantially cylindrical reactor cartridge 826 which is provided with upper closure member 816 and lower surface 882. Reactor cartridge 826 is sized so as to provide upper gas header space 814 above upper closure member 816 and below inner surfaces 812 of reactor closure member 810 and to provide lower gas header space 876 in the lower portion of reactor 800 above inner surfaces 881 of reactor shell 834 and below lower surfaces 882 of reactor cartridge 826. In addition, reactor cartridge 826 is sized so as to provide annular cooling channel 828 between the vertical surfaces of cartridge 826 and the adjacent portions of the inner vertical cylindrical surfaces 832 of reactor shell 834. Annular cooling channel 828 provides gaseous communication between upper gas header space 814 and lower gas header space 876 to permit cooling gases to pass therethrough for cooling of surfaces 832. Within reactor cartridge 826 is positioned: (1) in the upper portion thereof, first catalyst bed 830; (2) in the lower portion thereof, second catalyst bed 890; and (3) in an intermediate position between beds 830 and 890, reheat exchanger 840, which is adapted to provide gaseous communication between said catalyst beds, as will be described in more detail below.

Upper catalyst bed 830 comprises substantially circular, upper closure member 824, outer gas permeable wall 820 and inner gas permeable wall 836. Walls 820 and 836 are each secured to support plate 838. Upper closure member 824 is positioned so as to define an inner gas header space 822 adapted to provide gaseous communication with gas feed tube 804 and an annular shaped gas distribution channel 821 which is defined by, and positioned between, outer gas permeable wall 820 and the adjacent vertical surfaces of reactor cartridge 826. Inner gas permeable wall 836 is substantially cylindrical and defines a substantially cylindrical gas withdrawal channel 818 which is in gaseous communication with gas space 844, which is provided below catalyst support plate 838 and above upper tubesheet 855 of exchanger 840. Catalyst support plate 838 extends to form a circumferential seal baffle 842 to prevent direct gas flow between gas space 844 and gas distribution channel 821.

Reheat exchanger 840 is a baffled, tubular heat exchanger comprising upper tubesheet 855, lower tubesheet 856, tubes 852 and baffles 853. Tubes 852 are adapted receive gaseous effluent from first catalyst bed 830 via gas space 844 and to pass said first catalyst bed effluent gas in indirect heat exchange with the product gases from second catalyst bed 890, as will be described in more detail below. The thus cooled first catalyst bed effluent gas is withdrawn from tubes 852 into a lower gas space 857, which is positioned between tubesheet 856 and above catalyst bed closure plate 891. Baffles 853 cause the second catalyst bed effluent gas to flow a tortuous path through exchanger 840 for heating by said indirect heat exchange. The thus heated product gases are collected into a central gas space 846 for withdrawal via longitudinal gas product tube passage 848 which comprises the inner gas passage of product tube 801, positioned in the lower portion of reactor shell 834 for withdrawal of the product gases from the lower portion of reactor 800.

Second catalyst bed 890 comprises upper closure plate 891, catalyst support plate 892, outer cylindrical sheet 893, outer gas permeable wall 866 and inner gas permeable wall 862. Walls 866 and 862 are secured to support plate 892. Cylindrical sheet 893 is positioned so as to define an annular gas space 860 between sheet 893 and the adjacent vertical surfaces of reactor cartridge 826 and is provided with opening 868 for passage of gases therethrough into a gas distribution channel 864 which is defined by, and positioned between, the inner surface of sheet 893 and outer gas permeable wall 866. An inner, annular-shaped gas withdrawal channel 858 is provided between inner gas permeable wall 862 and the outer surfaces 854 of product tube 801 for withdrawal of product gases from the second catalyst bed 890 upwardly to the shell side of reheat exchanger 840.

In operation a first portion of the feed gases are introduced via feed tube 804 into upper gas space 822 and thence downwardly into annular gas distribution channel 821 for inward, radial flow through first catalyst bed 830. The product gases from first catalyst bed 830 are collected by gas withdrawal channel 818 and thence passed downwardly into gas space 844 and tubes 852 of reheat exchanger 840 wherein these gases heat the product gases from second catalyst bed 890. The thus-cooled first catalyst bed effluent gas is collected into second gas space 857 and then passed into annular gas space 860 for combination with the quench stream prior to entry into second catalyst bed 890.

The second portion of the feed gas stream is introduced via feed tube 802 and annular feed passage 806 into gas space 814 for passage to annular cooling channel 828 to provide the annular cooling of reactor shell 834. The thus-heated annular cooling gases are withdrawn from channel 828 into lower header space 876 and then passed upwardly through gas passage 888 and lower gas space 880 as the quench stream to mix with and further cool the partially-cooled first bed product gas. The combined gas is passed through opening 868 in cylindrical sheet 893 as feed to second catalyst bed 890. Product gases are withdrawn from second bed 890 via gas withdrawal channel 858 and introduced to reheat exchanger 840 for heating as described above prior to withdrawal from the reactor via product tube 801.

Of course, FIG. 11 is not the only possible embodiment employing quench feed in combination with a reheat exchanger in accordance with the process and apparatus of this invention. Alternatives will be apparent to one skilled in the art from the above disclosure. For example, while the reheat exchanger in FIG. 11 is indicated as being positioned intermediate between the first and second catalyst beds, it is also possible to employ the reheat exchanger within one of the two catalyst beds (analogous to the positioning of exchanger 740 in bed 774 in the embodiment of FIG. 10). Thus, referring again to FIG. 9, elimination of second exchanger 650 would mean that the partially cooled, first catalyst bed effluent gas withdrawn from reheat exchanger 640 could be passed directly to gas distribution channel 652 for feed to second catalyst bed 672 after being admixed with the second portion of the feedstream introduced to the reactor via conduit 666. In this embodiment of FIG. 9, stream 666 would constitute the quench feed.

Furthermore, it will also be apparent to one skilled in the art that the manner of introducing the various feedstreams and withdrawing the product stream from the reactor as illustrated in the foregoing figures is not critical to the present invention. For example, it is not critical that the feed conduit or product conduit be centrally located about the longitudinal axis of the reactor, and each of these can instead, if desired, be located off-center or located so as to introduce the gas feedstream into, and withdraw the product stream from, the side of the reactor. In addition, the direction of flow of the gases through the reactor is not critical and the overall direction of flow of feed and product stream can either be countercurrent or cocurrent and predominantly upflow, downflow, or horizontal. Obviously, therefore, the reactor of this invention can be positioned vertically as shown in the illustrations or horizontally or in any other desired manner.

The process and apparatus of this invention can be further illustrated by reference to the following examples.

COMPARATIVE EXAMPLES A AND B; EXAMPLE 1

A prior art two-bed ammonia converter 10 as illustrated in FIG. 1 having interbed heat exchanger 4 and lower heat exchanger 8 for cooling of the gas effluent from each bed by indirect heat exchange with a portion of the fresh ammonia syn gas feedstream 15, and having catalyst beds 2 and 6 containing a defined volume of a prior art catalyst for ammonia synthesis having a known catalyst activity (i.e., a "1× activity" catalyst) is configured for maximum waste heat recovery from reactor effluent 9 by use of a stream generator 16 to produce a high-level steam (1425 psig) and a feed/effluent exchanger 14 (employing a closed by-pass valve 25) to preheat feed 12 to the desired reactor feed temperature, employing a syn gas feed of the selected composition, which is passed to reactor 10 at a selected pressure, temperature and flow rate (i.e., space velocity).

The catalyst in each of beds 2 and 6 is replaced by an equal volume of a retrofit catalyst (i.e., the "3× activity" catalyst) having about three times the ammonia synthesis activity as the "1×activity" catalyst, and the reactor 10 is again employed to produce ammonia. In view of the higher activity of the retrofit catalyst, the synthesis gas compressor (not shown in FIG. 1) which supplies the synthesis gas feed can now be run at a lower speed, thereby requiring lower horsepower, to save energy. At the lower speeds, the reactor pressure is lowered and a lower rate of the synthesis gas feed to the reactor results. However, since the more active catalyst yields a higher conversion per pass (i.e., a higher ammonia content in the reactor effluent product gas) than the "1× activity" catalyst, the amount of ammonia produced in moles per unit time can be maintained at the same level as is obtained when using the "1× activity" catalyst.

Set forth below in Table I are temperatures and other values which would be obtained in use of the retrofitted "3× activity" catalyst in a prior art configuration as in FIG. 1 (Comparative Examples A and B). Comparative Example A only employs a high pressure steam generator. Comparative Example B seeks to obtain additional waste heat recovery by use of a lower pressure steam generator in addition to the high pressure steam generator employed in Comparative Example A.

In Example 1, an apparatus of this invention as illustrated in FIG. 2 having a reheat exchanger 104 and a high pressure steam generator 122 is employed under the conditions also summarized below in Table I, using the "3× activity" catalyst in the amounts and under the reaction conditions employed in Comparative Examples A and B.

It should be noted that in all of the cases listed in Table I, the bed inlet and outlet temperatures are equal. However, the reactor inlet and outlet temperatures are substantially different. It should also be noted that all three configurations achieve the same conversion of hydrogen and nitrogen to ammonia, that is all achieve the same outlet ammonia composition.

With the reduced circulation of synthesis gas which is possible in each of these configurations using the "3× activity" catalyst, recovery of all of the waste heat in the downstream 1425 psig boiler would require an increase in the outlet temperature from the reactor (stream 9 in FIG. 1) since a lower flow rate carries a lower heat capacity and therefore needs a larger temperature drop to transfer the same amount of heat in steam generator 16. However, with a more active catalyst, the kinetically optimum reactor bed temperatures are lower. Thus, the outlet temperature from the second catalyst bed drops substantially with the retrofit of the "3× activity" catalyst. In an attempt to achieve the higher desired reactor outlet temperatures, one can reduce the amount of feed preheating in the lower exchanger 8 of FIG. 1 until nearly completely by-passing this exchanger to make the reactor outlet temperature (stream 9) essentially equal to the outlet temperature of the second catalyst bed (stream 6b). However, this would still not achieve the objective of recovering all of the waste heat as 1425 psig steam in boiler 16 because the stream 9 temperature would still be too low.

Comparative Example A represents the situation in which excess heat, which is unable to be recovered in steam generator 16, is completely wasted. To avoid excessive feed preheating, the by-pass valve 25 on the feed/effluent exchanger 14, must be opened, causing valuable waste heat to be thrown away to cooling water in downstream cooler 18. In this case, nearly 22 percent of the waste heat would be completely thrown away.

In Comparative Example B, the effect is shown of the installation of a 600 psig boiler 24, downstream of the 1425 psig steam generator 16, to assist in recovering waste heat. With the installation of the lower pressure boiler 24, feed by-pass valve 25 could be kept closed. However, the 600 psig steam thus generated is less valuable than the 1425 psig steam originally produced. Moreover, installation of this boiler requires considerable investment for the boiler itself and for the required piping modifications.

Use of the catalyst apparatus of this invention as in Example 1, which employs the same size catalyst beds as above in combination with reheat exchanger 104 and interbed exchanger 108 (replacing interbed exchanger 4 and lower heat exchanger 8 of the prior art as shown in FIG. 1) results in a dramatic increase in the converter outlet temperature from 855° F. for Comparative Examples A and B, to 918° F. for Example 1. This higher temperature permits recovery of all of the waste heat as the more valuable 1425 psig steam, and not only avoids the 22-percent loss of waste heat to cooling water, but also eliminates the investment for a lower pressure boiler.

TABLE I

| Stream/Device | FIG. No. | Stream/ Apparatus No. | Comp. Ex. A | Comp. Ex. B | Example 1 |
|---|---|---|---|---|---|
| Preheated Syn Gas Feed (°F.) | 1 | 15 | 470 | 470 | — |
|  | 2 | 115 | — | — | 533 |
| Converter Inlet Pressure (psia) | 1 | 15 | 2585 | 2585 | — |
|  | 2 | 115 | — | — | 2585 |
| Converter Feed Rate (mol/hr) as percentage of "1x activity" catalyst Feed Rate | 1 | 15 | 89.7 | 89.7 | — |
|  | 2 | 115 | — | — | 89.7 |
| First Bed Feed (°F.) | 1 | 2a | 719 | 719 | — |
|  | 2 | 121 | — | — | 719 |
| First Bed Effluent (°F.) | 1 | 2b | 949 | 949 | — |
|  | 2 | 103 | — | — | 949 |
| Second Bed Feed (°F.) | 1 | 6a | 708 | 708 | — |
|  | 2 | 109 | — | — | 708 |
| Second Bed Effluent (°F.) | 1 | 6b | 858 | 858 | — |
|  | 2 | 107 | — | — | 858 |
| Converter Outlet NH3 Mole Percent | 1 | 9 | 18.54 | 18.54 | — |
|  | 2 | 124 | — | — | 18.54 |
| Ammonia Product (°F.) | 1 | 9 | 855 | 855 | — |
|  | 2 | 124 | — | — | 918 |
| High Pressure Boiler Effluent (°F.) | 1 | 13 | 593 | 593 | — |
|  | 2 | 122 | — | — | 594 |

TABLE I-continued

| Stream/Device | FIG. No. | Stream/ Apparatus No. | Comp. Ex. A | Comp. Ex. B | Example 1 |
|---|---|---|---|---|---|
| Low Pressure Boiler Effluent (°F.) | 1 | 24 | — | 521 | — |
|  | 2 | 128 | — | — | — |
| Feed Effluent Exchanger Outlet (°F.) | 1 | 17 | 241 | 166 | — |
|  | 2 | 117 | — | — | 173 |
| Bypass Valve Setting | 1 | 25 | OPEN | CLOSED | — |
|  | 2 | 125 | — | — | CLOSED |
| Percentage of Waste Heat Lost to Cooling Water |  |  | 22.0 | — | — |
| Percentage of Waste Heat Degraded from 1425 psig steam to 600 psig steam |  |  | — | 22.0 | — |

COMPARATIVE EXAMPLES C AND D AND EXAMPLES 2-3

These examples illustrate the improvement achieved by the use of the process and apparatus of this invention by the retrofit of a still more active catalyst (herein termed the "6× activity" catalyst) having about double the activity for ammonia synthesis of the "3× activity" catalyst employed in Example 1 and Comparative Examples A and B above. The "6× activity" catalyst therefore has approximately 6 times the activity of the "1× activity" catalyst. With this higher activity catalyst, an even larger reduction in syn gas compressor speed is possible compared to that which is used above for the "3× activity" catalyst. Correspondingly, the pressure and reactor feed flow rate will be decreased. Also, the kinetically optimum second bed outlet temperature, and therefore the prior art converter outlet temperature, are further reduced. This makes heat recovery from the converter effluent stream using prior art apparatus as in FIG. 1, even more difficult.

Comparative Examples C and D in Table II correspond to Comparative Examples A and B discussed above. Therefore, Comparative Example C corresponds to the retrofit of the 6× activity catalyst into an apparatus of FIG. 1 in which a 1425 psig steam generator 16 is used, and Comparative Example C adds a 600 psig steam generator 24. Example 2 corresponds to the apparatus of FIG. 2 as configured for Example 1 above, and employs a 1425 psig steam generator 122. The additional example, namely Example 3, corresponds to the apparatus as configured for Example 2, except that a 600 psig steam generator 128 is also employed to receive the partially cooled ammonia product gas effluent withdrawn from the 1425 psig steam generator 122 for further heat recovery.

From Table II, it can be seen that the converter outlet temperature using the prior art configurations in Comparative Examples C and D, which employed an interbed and lower heat exchanger, drops from 855° to 825° F., which severely reduces the ability to recover converter effluent waste heat. In fact, based on Comparative Example C, nearly 38 percent of the available waste heat is lost to cooling water (i.e., exchanger 14 by-pass valve 25 is in the open position). For Comparative Example D, the installation of the 600 psig boiler 24 reduces this loss to 17 percent. However, the incremental 21-percent recovered heat is downgraded from the higher value 1425 psig level to the less valuable 600 psig level.

Example 2, using the reheat basket of this invent in which a reheat exchanger 104 is employed, results in a 21-percent loss of converter effluent waste heat to cooling water. However, all of the waste heat that is recovered in boiler 122 is used for generating the more valuable 1425 psig steam, and the heat recovery is much greater than in the case of Comparative Example C.

Example 3, which employs a reheat exchanger 104 in combination with the additional use of 600 psig steam generator downstream of the 1425 psig steam generator 122, permits the recovery of all the waste heat, although 21 percent has been downgraded to the less valuable 600 psig level. In contrast, Comparative Example D is unable to recover all of the converter waste heat even in a train in which a 1425 boiler 16 and 600 psig boiler 24 is used, and 17 percent of the waste heat is lost to cooling water in Comparative Example D.

Therefore, the apparatus of this invention permits higher converter outlet temperatures which enhance the recovery of converter effluent waste heat for high pressure steam generation.

TABLE II

| Stream/Device | FIG. No. | Stream/ Apparatus No. | Comp. Ex. C | Comp. Ex. D | Example 2 | Example 3 |
|---|---|---|---|---|---|---|
| Preheated Syn Gas Feed (°F.) | 1 | 15 | 400 | 400 | — | — |
|  | 2 | 115 | — | — | 463 | 463 |
| Converter Inlet Pressure (psia) | 1 | 15 | 2360 | 2360 | — | — |
|  | 2 | 115 | — | — | 2360 | 2360 |
| Converter Feed Rate (mol/hr) as Percentage of "1x Activity" Catalyst Feed Rate | 1 | 15 | 81.5 | 81.5 | — | — |
|  | 2 | 115 | — | — | 81.5 | 81.5 |
| First Bed Feed (°F.) | 1 | 2a | 660 | 660 | — | — |
|  | 2 | 121 | — | — | 660 | 660 |
| First Bed Effluent (°F.) | 1 | 2b | 918 | 918 | — | — |
|  | 2 | 103 | — | — | 918 | 918 |
| Second Bed Feed (°F.) | 1 | 6a | 708 | 708 | — | — |

TABLE II-continued

| Stream/Device | FIG. No. | Stream/ Apparatus No. | Comp. Ex. C | Comp. Ex. D | Example 2 | Example 3 |
|---|---|---|---|---|---|---|
| Second Bed Effluent (°F.) | 2 | 109 | — | — | 708 | 708 |
|  | 1 | 6b | 826 | 826 | — | — |
| Converter Outlet NH3 Mole Percent | 2 | 107 | — | — | 826 | 826 |
|  | 1 | 9 | 20.0 | 20.0 | — | — |
| Ammonia Product (°F.) | 2 | 124 | — | — | 20.0 | 20.0 |
|  | 1 | 9 | 825 | 825 | — | — |
| High Pressure Boiler Effluent (°F.) | 2 | 124 | — | — | 888 | 888 |
|  | 1 | 13 | 592 | 592 | — | — |
| Low Pressure Boiler Effluent (°F.) | 2 | 122 | — | — | 593 | 593 |
|  | 1 | 24 | — | 510 | — | — |
| Feed Effluent Exchanger Outlet (°F.) | 2 | 128 | — | — | — | 510 |
|  | 1 | 17 | 308 | 226 | — | — |
| Bypass Valve Setting | 2 | 117 | — | — | 242 | 166 |
|  | 1 | 25 | OPEN | OPEN | — | — |
|  | 2 | 125 | — | — | OPEN | CLOSED |
| Percentage of Waste Heat Lost to Cooling Water |  |  | 38.0 | 17.0 | 21.0 | — |
| Percentage of Waste Heat Degraded from 1425 psig steam to 600 psig steam |  |  | — | 21.0 | — | 21.0 |

From the foregoing description, one skilled in the art can easily ascertain the essential characteristics of this invention and without departing from the spirit and scope thereof can make various changes and/or modifications to the invention for adapting it to various usages and conditions. Accordingly, such changes and modifications are properly intended to be within the full range of equivalents of the following claims.

What is claimed is:

1. In an exothermic catalytic reactor having at least two catalytic beds arranged for sequential gas flow therethrough; gas supply means for introducing a gas feedstream to the first of said catalyst beds for partial reaction of said gas feedstream therein; interbed gas cooling means for cooling the gas effluent from each catalyst bed to remove heat therefrom prior to passing said gas effluent to the next of said sequentially arranged catalyst beds and means for removing a gaseous effluent from the last of such catalyst reactor beds as said gas product, the improvement wherein said reactor additionally comprises (a) reheat exchange means for heating at least a portion of said last catalyst bed effluent gas by indirect heat exchange with a heating fluid comprising at least a portion of the gaseous effluent from at least one other of said reactor beds prior to withdrawal of said product gas from said reactor; and (b) gas quenching means for introducing at least a portion of said gas feedstream as quenching fluid to at least one of (i) said heating fluid after removal of said heating fluid from said reheat exchange means, and (ii) the gaseous effluent from at least one of said catalyst beds other than said last bed or said bed from which said heating fluid is obtained.

2. The improved exothermic catalytic reactor of claim 1 wherein each said catalyst bed is arranged for radial flow of gases therethrough.

3. An improved exothermic catalytic reactor for synthesis of gaseous products from a gas feedstream at elevated temperature and pressure comprising:
   (a) a pressure shell constituting the outer surface of the reactor and of substantially cylindrical shape;
   (b) a first annularly-shaped catalyst bed positioned within said pressure shell at one end thereof and having an outer concentric gas permeable wall, an inner concentric gas permeable wall and two opposite horizontal catalyst plates secured to said gas permeable walls of said first catalyst bed;
   (c) a second annularly shaped catalyst bed positioned within said pressure shell at the opposite end thereof and having an outer concentric gas permeable wall, an inner concentric gas permeable wall and two opposite horizontal catalyst plates secured to said gas permeable walls of said second catalyst bed;
   (d) gas feed means for supplying said gas feedstream to said first catalyst bed for partial reaction therein to form a first bed effluent gas;
   (e) reheat exchange means positioned within said pressure shell for cooling of said first bed effluent gas;
   (f) gas cooling means for further cooling of a cooled first bed effluent gas withdrawn from said reheat exchange means;
   (g) means for withdrawing a further cooled first bed effluent gas from said gas cooling means and introducing said gas as feed to said second catalyst bed for further reaction therein to form a second bed effluent gas; and
   (h) means for passing said second bed effluent gas to said reheat exchange means for heating therein by indirect heat exchange with said first bed effluent gas and for withdrawing the thus-heated second bed effluent gas from said reactor as said gaseous product.

4. The improved exothermic reactor of claim 3 wherein said gas cooling means comprises second heat exchange means for further cooling of said cooled first bed effluent gas by indirect heat exchange with at least a portion of said gas feedstream and for passing said further cooled gas as feed to said second catalyst bed, and wherein said reactor additionally comprises second gas feed means for supplying said gas feedstream portion to said second heat exchange means and for passing the thus-heated gas feedstream portion to said first catalyst bed as at least a portion of the feed thereto.

5. The improved exothermic reactor of claim 3 wherein said gas cooling means comprises quench gas means for admixing a portion of said gas feedstream with said cooled first bed effluent gas withdrawn from said reheat exchange means to form said further cooled gas for feed to said second catalyst bed.

6. A high pressure reactor for carrying out catalytic gas synthesis of gaseous products from a gas feedstream at elevated temperature and pressure comprising:
   (a) a pressure shell;
   (b) a tubular chamber disposed within said pressure shell and defining an outer, annular cooling channel between said tubular chamber and said pressure shell;
   (c) first and second annular-shaped catalyst beds disposed separately and vertically within said tubular chamber, each said catalyst bed being adapted for housing solid catalyst particles and for radial flow of gas therethrough, to form a gaseous effluent from each said bed;
   (d) first and second heat exchangers disposed separately and vertically within said tubular chamber which are adapted for indirect heat exchange of gas streams and which provide gaseous communication between said first and second catalyst beds;
   (e) first gas supply means for passing a first gas feedstream first to said annular channel for cooling of said pressure shell, and thence sequentially to (1) said second heat exchanger for further heating of said first gas feedstream therein; and (2) said first catalyst bed as a portion of the feed thereto;
   (f) second gas supply means for introducing a second gas feedstream to said first catalyst bed as the remaining portion of the feed thereto;
   (g) first catalyst bed effluent means for introducing the effluent gas from said first catalyst bed as heating fluid to said first heat exchanger;
   (h) first exchanger gas effluent means for withdrawing partially cooled first catalyst bed effluent gas from said first heat exchanger and for introducing said partially cooled gas as feed to said second heat exchanger;
   (i) second exchanger gas effluent means for withdrawing further cooled first catalyst bed effluent gas from said second heat exchanger and for introducing said further cooled gas as feed to said second catalyst bed; and
   (j) second catalyst bed effluent means for passing effluent gas from said second catalyst bed to said first heat exchanger for heating therein by indirect heat exchange with said first catalyst bed effluent gas and for withdrawing said heated second catalyst bed effluent gas from said reactor as a gaseous product stream.

7. A high pressure reactor for carrying out catalytic gas synthesis of gaseous products from a gas feedstream at elevated temperature and pressure comprising:
   (a) a pressure shell;
   (b) a tubular chamber disposed within said pressure shell and defining an outer, annular cooling channel between said tubular chamber and said pressure shell;
   (c) first and second annular-shaped catalyst beds disposed separately and vertically within said tubular chamber, each said catalyst bed being adapted for housing solid catalyst particles and for radial flow of gas therethrough, to form a gaseous effluent from each said bed;
   (d) a heat exchanger housed in said tubular chamber which is adapted for indirect heat exchange of gas streams;
   (e) first gas supply means for introducing a first gas feedstream to said annular channel to cool said pressure shell and for passing the resulting heated feedstream to said first catalyst bed as the feed thereto;
   (f) first catalyst bed effluent means for introducing the effluent gas from said first catalyst bed as heating fluid to said heat exchanger;
   (g) first exchanger gas effluent means for withdrawing partially cooled first catalyst bed effluent gas from said heat exchanger;
   (h) second gas supply means for introducing a quench gas stream to said withdrawn, partially cooled first catalyst bed effluent gas and for passing said gas mixture as feed to said second catalyst bed, whereby the temperature of the gas feed to said second catalyst bed is controlled; and
   (i) second catalyst bed effluent means for passing effluent gas from said second catalyst bed to said heat exchanger for heating therein by indirect heat exchange with said first catalyst bed effluent gas and for withdrawal of said heated second catalyst bed effluent gas from said reactor as a gaseous product stream.

8. A high pressure reactor for carrying out catalytic gas synthesis of gaseous products from a gas feedstream at elevated temperature and pressure comprising:
   (a) a pressure shell;
   (b) first, second and third annular-shaped catalyst beds disposed separately and vertically within said pressure shell, each said catalyst bed being adapted for housing solid catalyst particles and for radial flow of gas therethrough to form a gaseous effluent from each said bed;
   (c) reheat exchanger means within said pressure shell for indirect heat exchange of gas streams;
   (d) first gas supply means for passing gas feedstream to said first catalyst bed as at least a portion of the gas feed thereto;
   (e) first catalyst bed effluent means for passing the gas effluent from said first bed as heating fluid to said reheat exchange means;
   (f) reheat exchanger effluent means for withdrawing an at least partially cooled, first catalyst bed effluent gas from said reheat exchange means and for introducing said partially cooled gas as feed to said second catalyst bed;
   (g) second catalyst bed effluent means for withdrawing a gaseous effluent from said second catalyst bed;
   (h) means for cooling said second catalyst bed effluent gas, and for passing said cooled second catalyst bed effluent gas as feed to said third catalyst bed; and
   (i) third catalyst bed effluent means for passing at least a portion of the effluent gas from said third catalyst bed to said first heat exchange means for heating therein by indirect heat exchange with said first catalyst bed effluent gas and for withdrawing said heated third catalyst bed effluent gas from said reactor as a gaseous product stream.

9. The high pressure reactor of claim 8 wherein said second bed cooling means comprises an indirect heat exchanger and wherein said reactor additionally comprises second gas supply means for passing a second portion of said gas feedstream to said second catalyst bed effluent cooling means for heating by indirect heat exchange with said second bed effluent gas and for combining the thus-heated second feedstream portion with the feed to said first catalyst bed.

10. The high pressure reactor of claim 9 wherein said reactor additionally comprises second heat exchange means within said pressure shell adapted for further cooling of said partially cooled first catalyst bed effluent gas prior to introducing said gas to said second catalyst bed by indirect heat exchange with a separate gas feedstream and for combining the thus-heated separate gas feedstream with the feed to said first catalyst bed.

11. The high pressure reactor of claim 9 wherein said reactor additionally comprises means for admixing a quench gas stream with said partially cooled first catalyst bed effluent gas and for passing the resulting gas mixture as said feed to said second catalyst bed.

12. The high pressure reactor of claim 8 wherein said second catalyst bed effluent cooling means comprises quench gas supply means for admixing a quench gas stream with said second catalyst bed effluent gas for cooling of said effluent gas and for introducing the resulting gas mixture to said third catalyst bed as the feed thereto.

13. The high pressure reactor of claim 12 wherein said reactor additionally comprises second heat exchange means within said pressure shell adapted for further cooling of said partially cooled first catalyst bed effluent gas prior to introducing said gas to said second catalyst bed by indirect heat exchange with a separate gas feedstream and for combining the thus-heated separate gas feedstream with the feed to said first catalyst bed.

14. The high pressure reactor of claim 12 wherein said reactor additionally comprises means for admixing a quench gas stream with said partially cooled first catalyst bed effluent gas and for passing the resulting gas mixture as said feed to said second catalyst bed.

* * * * *